United States Patent
Kim et al.

(10) Patent No.: US 9,564,954 B2
(45) Date of Patent: Feb. 7, 2017

(54) METHOD FOR MAPPING AND DEMAPPING RESOURCE IN A WIRELESS COMMUNICATION SYSTEM AND AN APPARATUS THEREOF

(71) Applicant: Samsung Electronics Co., Ltd., Suwon-si, Gyeonggi-do (KR)

(72) Inventors: Sung Tae Kim, Suwon-si (KR); Youn Sun Kim, Seongnam-si (KR); Jin Kyu Han, Seoul (KR); In Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/570,353

(22) Filed: Dec. 15, 2014

(65) Prior Publication Data

US 2015/0098518 A1    Apr. 9, 2015

Related U.S. Application Data

(63) Continuation of application No. 14/041,306, filed on Sep. 30, 2013, which is a continuation of application
(Continued)

(30) Foreign Application Priority Data

Jan. 8, 2010  (KR) ............ 10-2010-0001596
Sep. 29, 2010  (KR) ............ 10-2010-0094810

(51) Int. Cl.
*H04B 7/02* (2006.01)
*H04L 1/02* (2006.01)
(Continued)

(52) U.S. Cl.
CPC .......... *H04B 7/04* (2013.01); *H04L 1/0606* (2013.01); *H04L 25/03343* (2013.01); *H04L 5/0007* (2013.01); *H04L 5/0023* (2013.01)

(58) Field of Classification Search
CPC ......... H04B 7/04; H04L 5/007; H04L 5/0023; H04L 25/03343; H04L 1/0606
(Continued)

(56) References Cited

U.S. PATENT DOCUMENTS

| 6,388,587 B1 | 5/2002 | Brickner et al. |
| 8,548,083 B2 | 10/2013 | Kim et al. |

(Continued)

FOREIGN PATENT DOCUMENTS

| CN | 1969522 A | 5/2007 |
| CN | 101540751 A | 9/2009 |

(Continued)

OTHER PUBLICATIONS

U.S. Appl. No. 14/041,306, filed Sep. 30, 2013.*
(Continued)

*Primary Examiner* — Phuong Phu
(74) *Attorney, Agent, or Firm* — Jefferson IP Law, LLP

(57) ABSTRACT

A method and apparatus for mapping/demapping a resource efficiently in a wireless communication system are provided. A resource mapping method of a transmitter in a wireless communication system includes precoding pairs of symbols, arranging the pairs of precoded symbols adjacently in a resource block, and transmitting the pairs of precoded symbols in the resource block.

10 Claims, 32 Drawing Sheets

Related U.S. Application Data

No. 12/986,505, filed on Jan. 7, 2011, now Pat. No. 8,548,083.

(51) Int. Cl.
*H04B 7/04* (2006.01)
*H04L 25/03* (2006.01)
*H04L 1/06* (2006.01)
*H04L 5/00* (2006.01)

(58) Field of Classification Search
USPC ........ 375/267, 260, 299, 347; 455/500, 501, 455/101; 370/330, 436
See application file for complete search history.

(56) References Cited

U.S. PATENT DOCUMENTS

| | | |
|---|---|---|
| 2005/0281350 A1 | 12/2005 | Chae et al. |
| 2008/0049690 A1 | 2/2008 | Kuchibhotla et al. |
| 2008/0205533 A1 | 8/2008 | Lee et al. |
| 2008/0225964 A1 | 9/2008 | Han et al. |
| 2009/0122889 A1 | 5/2009 | Lee et al. |
| 2009/0232239 A1 | 9/2009 | Ko et al. |
| 2010/0208673 A1 | 8/2010 | Nam et al. |
| 2010/0284477 A1 | 11/2010 | Kwon et al. |
| 2010/0322325 A1 | 12/2010 | Joko |
| 2011/0110444 A1* | 5/2011 | Roh et al. ................... 375/260 |
| 2012/0300652 A1 | 11/2012 | Kishiyama et al. |

FOREIGN PATENT DOCUMENTS

| | | |
|---|---|---|
| EP | 1 959 585 A2 | 8/2008 |
| EP | 2 523 377 A1 | 11/2012 |
| JP | 2009-060420 A | 3/2009 |
| JP | 2009-125978 A | 6/2009 |
| KR | 10-2009-0049972 A | 5/2009 |
| WO | 0103304 A1 | 1/2001 |
| WO | 2009/041770 A2 | 4/2009 |
| WO | 2009/104609 A1 | 8/2009 |
| WO | 2009/153808 A2 | 12/2009 |
| WO | 2011/056016 A2 | 5/2011 |

OTHER PUBLICATIONS

Nortel, The resource element mapping of the control channel elements, 3GPP TSG RAN WG1 meeting #49, R1-072382, May 7-11, 2007, Kobe, Japan.

Samsung Electronics, LTE PHY Spec, Internet Citation, Jun. 24, 2008, pp. 1-77, XP002558928, Retrieved from the Internet: URL: http://www.google.de/search?hl=de&source=hp&q=L TE+PHY+Spec.+samsung&meta=&aq= f &oq= [retrieved on Dec. 3, 2009].

Samsung, "Discussions on CSI-RS for LTE-Advanced", 3GPP TSG-RAN WG1 #57, R1-092204, pp. 1-7.

3GPP TSG RAN WG1 Meeting #50 R1-073513, Athens Greece, Aug. 20, 2007.

* cited by examiner

FIG. 2
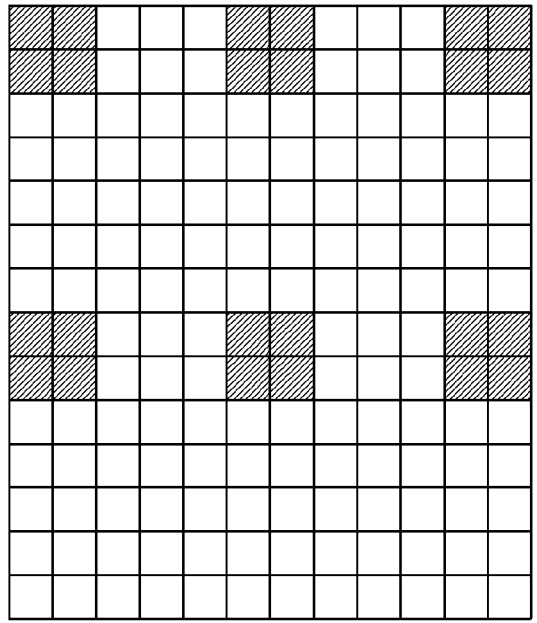
(b) 3 ~ 8 antenna port
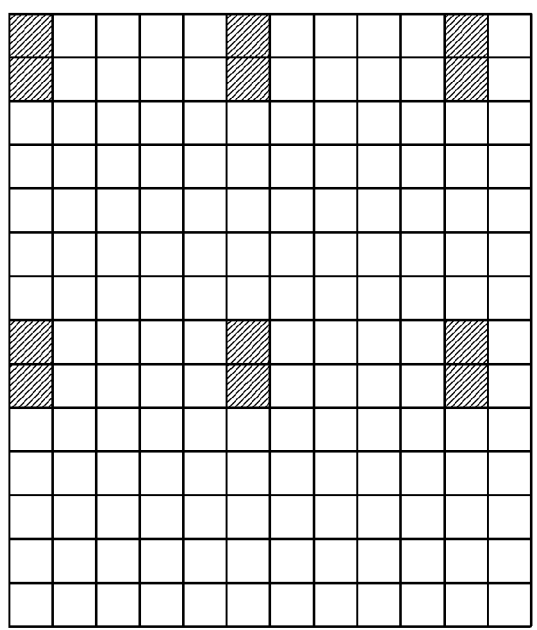
(a) 1, 2 antenna port
▨ DM-RS
☐ RE FIG. 20
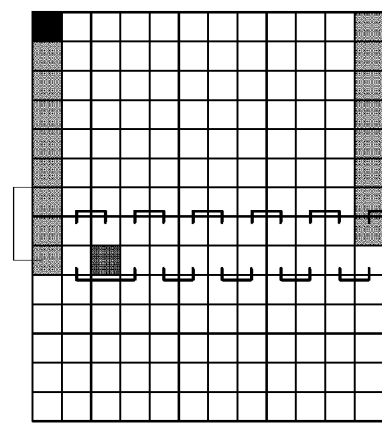
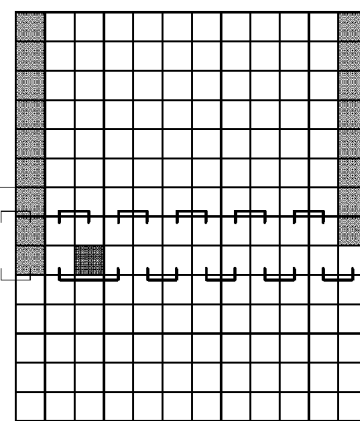
(a) odd # of PRBs
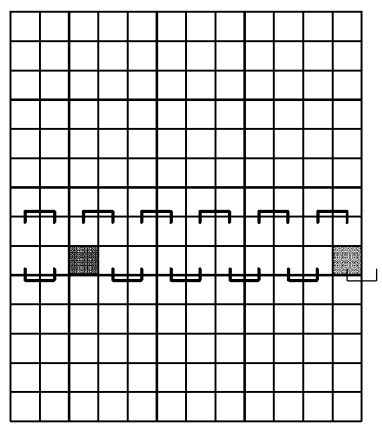
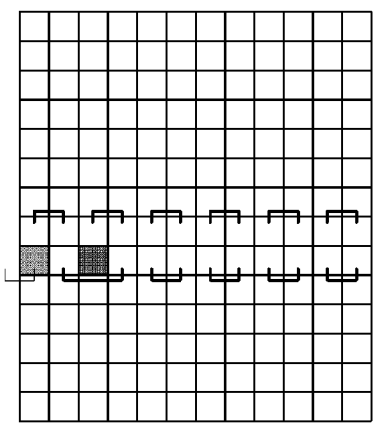
(b) even # of PRBs FIG. 22
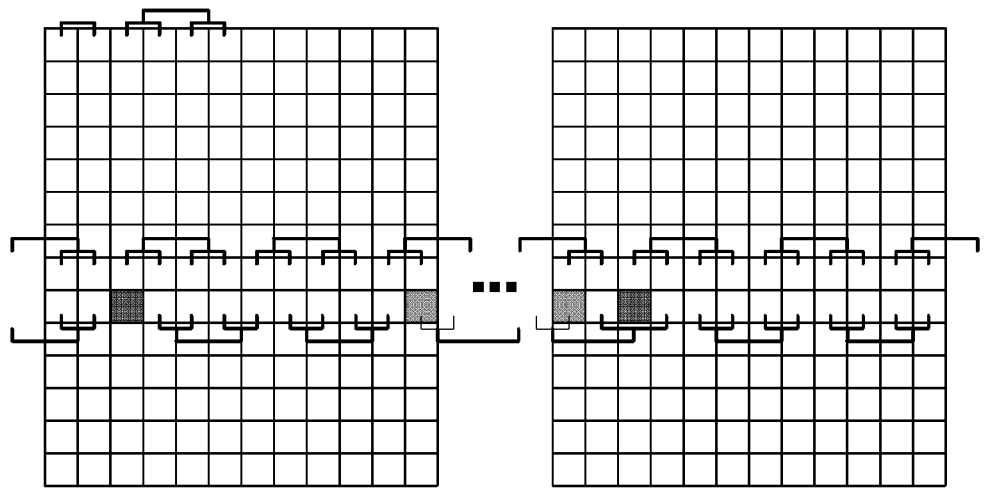
(b) even # of PRBs
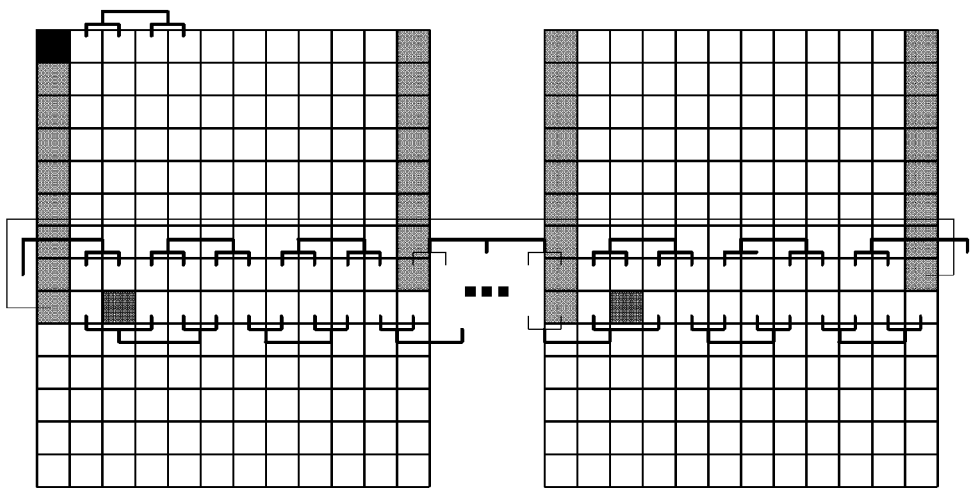
(a) odd # of PRBs FIG. 24
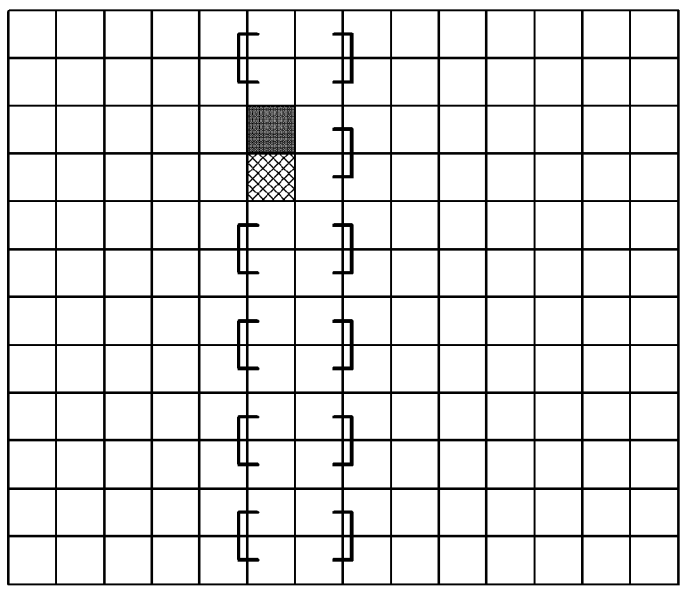
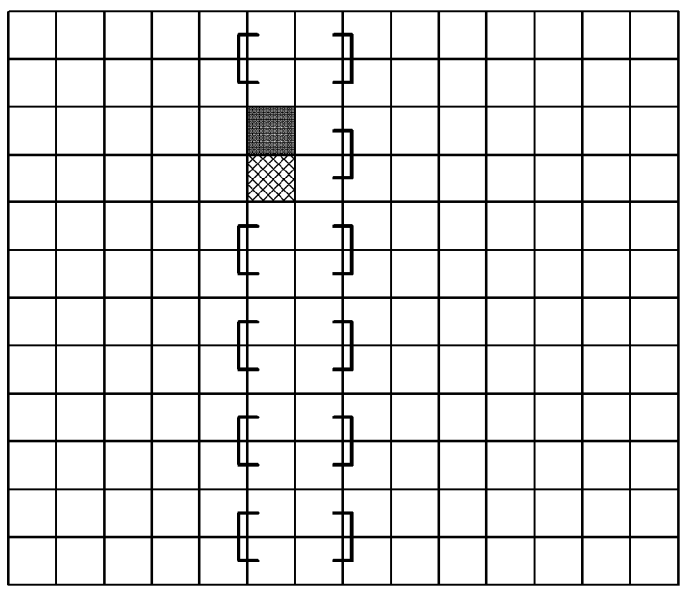
CSI-RS
No transmission
PDSCH RE FIG. 25
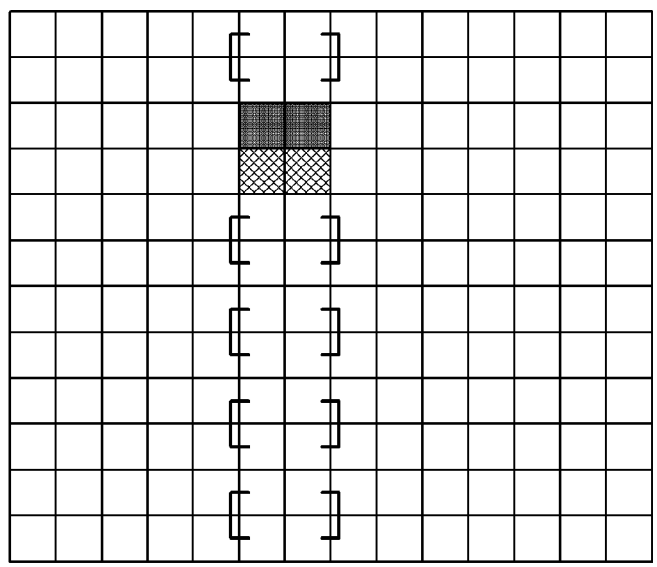
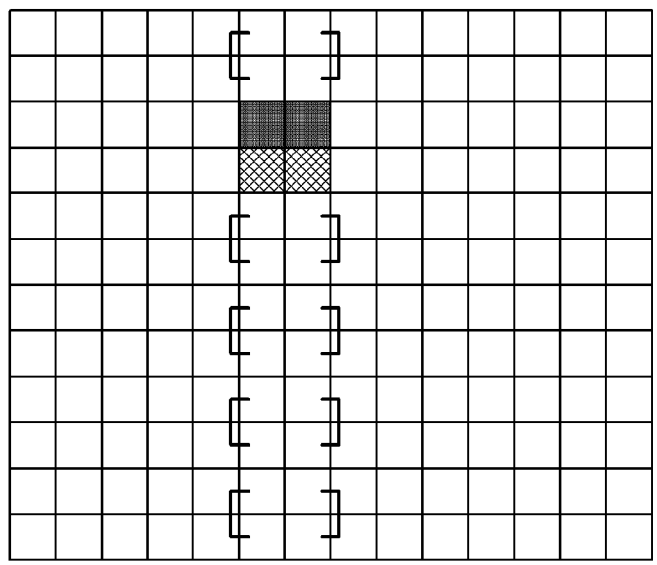

FIG. 28
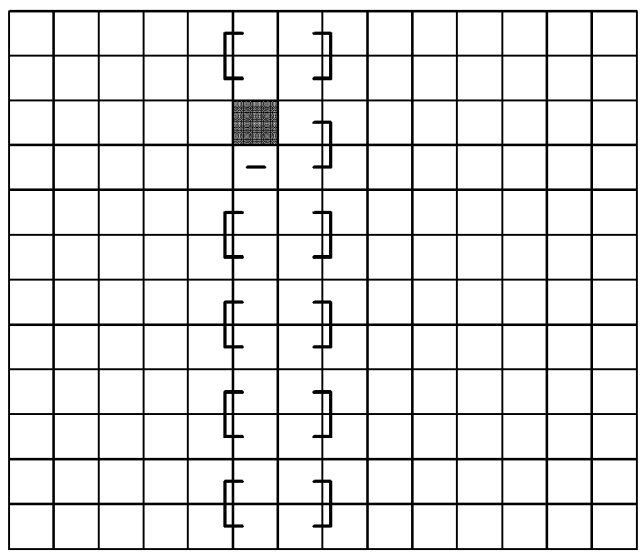
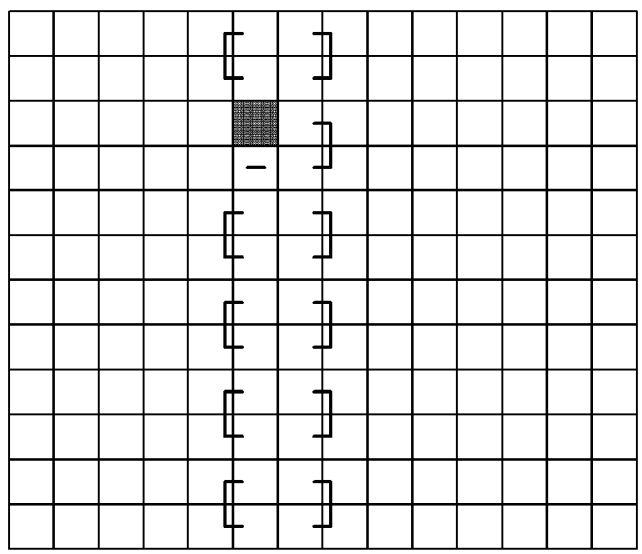
▨ CSI-RS
— W/O SFBC precoding
☐ PDSCH RE

FIG. 29
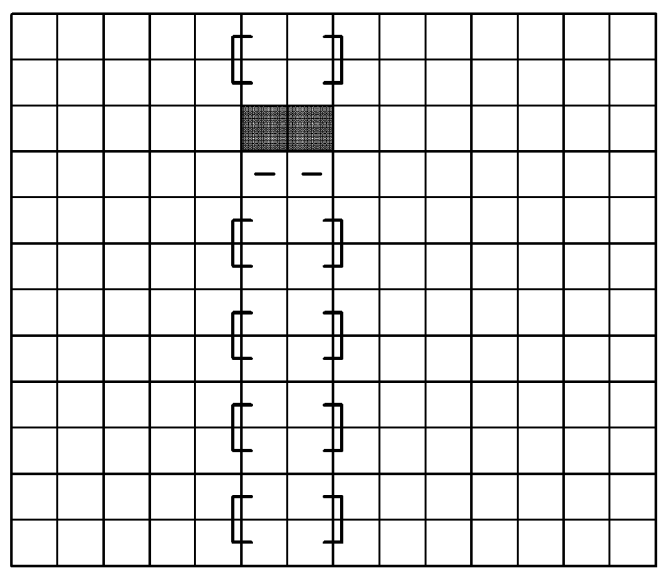
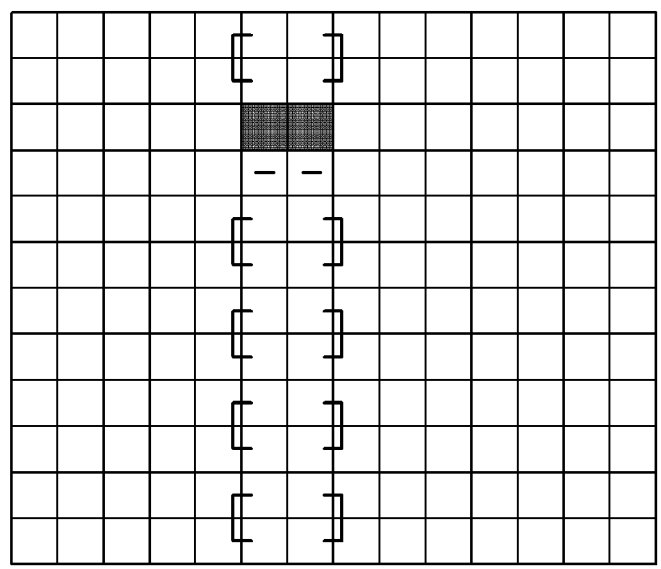
CSI-RS
— W/O SFBC precoding
PDSCH RE

METHOD FOR MAPPING AND DEMAPPING RESOURCE IN A WIRELESS COMMUNICATION SYSTEM AND AN APPARATUS THEREOF

PRIORITY

This application is a continuation of U.S. patent application Ser. No. 14/041,306, filed on Sep. 30, 2013, which is a continuation of U.S. patent application Ser. No. 12/986,505, filed on Jan. 7, 2011, which claimed the benefit under 35 U.S.C. §119(a) of a Korean patent application filed on Jan. 8, 2010 in the Korean Intellectual Property Office and assigned Serial No. 10-2010-0001596, and of a Korean patent application filed on Sep. 29, 2010 in the Korean Intellectual Property Office and assigned Serial No. 10-2010-0094810, the entire disclosure of each of which are hereby incorporated by reference.

BACKGROUND OF THE INVENTION

1. Field of the Invention

The present invention relates to wireless communications. More particularly, the present invention relates to a method and apparatus for mapping/demapping resources efficiently in a wireless communication system.

2. Description of the Related Art

Most of the evolved 3rd generation wireless communication systems, including 3rd Generation Partnership Project (3GPP) Long Term Evolution (LTE), 3GPP LTE-Advanced (LTE-A), and Institute of Electrical and Electronics Engineers (IEEE) 802.16m, have adopted Orthogonal Frequency Division Multiplexing (Multiple Access) (OFDM(A)) as a multi-carrier multiple access scheme.

In the downlink of a wireless communication system adopting multi-carrier multiple access, a base station (e.g., evolved Node B (eNB)) allocates resources to a terminal (e.g., User Equipment (UE) and Mobile station (MS)) for data transmission in units of a Resource Block (RB) which is composed of a plurality of subcarriers and a plurality of OFDM symbols.

In transmission, the base station can use spatial multiplexing and transmission diversity. In a 3GPP LTE or LTE-A system, transmission diversity includes applying precoding to codewords mapped to individual layers and mapping the precoded codewords to the Resource Elements (REs) of the RBs allocated to the corresponding terminals. In the 3GPP LTE-A system, a Demodulation Reference Signal (DM-RS), for demodulating, at the UEs, the received signal, and a Channel State Information Reference Signal (CSI-RS), for measuring the channel state, are introduced. However, these reference signals are not being used in the 3GPP LTE system. With the introduction of the DM-RS and CSI-RS, the resource locations for data transmission are changed as compared to the conventional LTE system and, as a consequence, the precoding and resource mapping designed for use in the LTE system for transmission diversity cannot be applied to the LTE-A system without performance degradation.

SUMMARY OF THE INVENTION

An aspect of the present invention is to address at least the above-mentioned problems and/or disadvantages and to provide at least the advantages described below. Accordingly an aspect of the present invention is to provide a resource mapping/demapping method and apparatus that is capable of overcoming the decoding performance degradation problem caused by precoded paired symbols that are mapped to resource elements positioned far apart from each other in a resource block.

In accordance with an aspect of the present invention, a resource mapping method of a transmitter in a wireless communication system is provided. The method includes precoding pairs of symbols, arranging the pairs of precoded symbols adjacently in a resource block, and transmitting the pairs of precoded symbols in the resource block.

In accordance with another aspect of the present invention, a resource demapping method of a receiver in a wireless communication system is provided. The method includes demapping, when a signal is received, pairs of precoded symbols in a resource block assigned to the receiver according to a mapping rule, the precoded symbols being arranged adjacently in the resource block, and decoding the pairs of precoded symbols according to a paired symbol precoding scheme.

In accordance with another aspect of the present invention, a resource mapping apparatus of a transmitter in a wireless communication system is provided. The apparatus includes a precoding pair selector for selecting pairs of symbols, a precoder for precoding the selected pairs of symbols, a resource element mapper for arranging the pairs of precoded symbols in a resource block, and an Orthogonal Frequency Division Multiplexing (OFDM) symbol generator for performing OFDM modulation on the arranged pairs of symbols and for transmitting the OFDM symbols through antennas.

In accordance with still another aspect of the present invention, a resource demapping apparatus of a receiver in a wireless communication system is provided. The apparatus includes a resource element demapper for demapping, when a signal is received, pairs of precoded symbols in a resource block assigned to the receiver according to a mapping rule, the precoded symbols being arranged adjacently in the resource block, and a symbol decoder for decoding the pairs of precoded symbols according to a paired symbol precoding scheme.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description in conjunction with the accompanying drawings, in which:

FIG. 2 is a diagram illustrating arrangements of Demodulation Reference Signals (DM-RS) for use in an LTE-Advanced (LTE-A) system according to an exemplary embodiment of the present invention;

FIG. 20 is a diagram illustrating exemplary arrangements of precoded paired symbols when the number of Common Reference Signal (CRS) antenna ports is 2 and the number of Channel State Information Reference Signal (CSI-RS) antenna ports is 1 in an LTE-A system according to an exemplary embodiment of the present invention;

FIG. 22 is a diagram illustrating exemplary arrangements of precoded paired symbols when the number of CRS antenna ports is 4 and the number of CSI-RS antenna ports is 1 in an LTE-A system according to an exemplary embodiment of the present invention;

FIG. 24 is a diagram illustrating an arrangement of precoded paired symbols when the number of CRS antenna ports is 2 and the number of CSI-RS antenna ports is 1 in an LTE-A system according to an exemplary embodiment of the present invention;

FIG. 25 is a diagram illustrating arrangements of precoded paired symbols when the number of CRS antenna ports is 2 and the number of CSI-RS antenna ports is 2 in an LTE-A system according to an exemplary embodiment of the present invention;

FIG. 28 is a diagram illustrating an arrangement of non-precoded symbols when the number of CRS antenna ports is 2 and the number of CSI-RS antenna ports is 1 in an LTE-A system according to an exemplary embodiment of the present invention;

FIG. 29 is a diagram illustrating an arrangement of non-precoded symbols when the number of CRS antenna ports is 2 and the number of CSI-RS antenna ports is 2 in an LTE-A system according to an exemplary embodiment of the present invention;

DETAILED DESCRIPTION OF EXEMPLARY EMBODIMENTS

Figure 1:
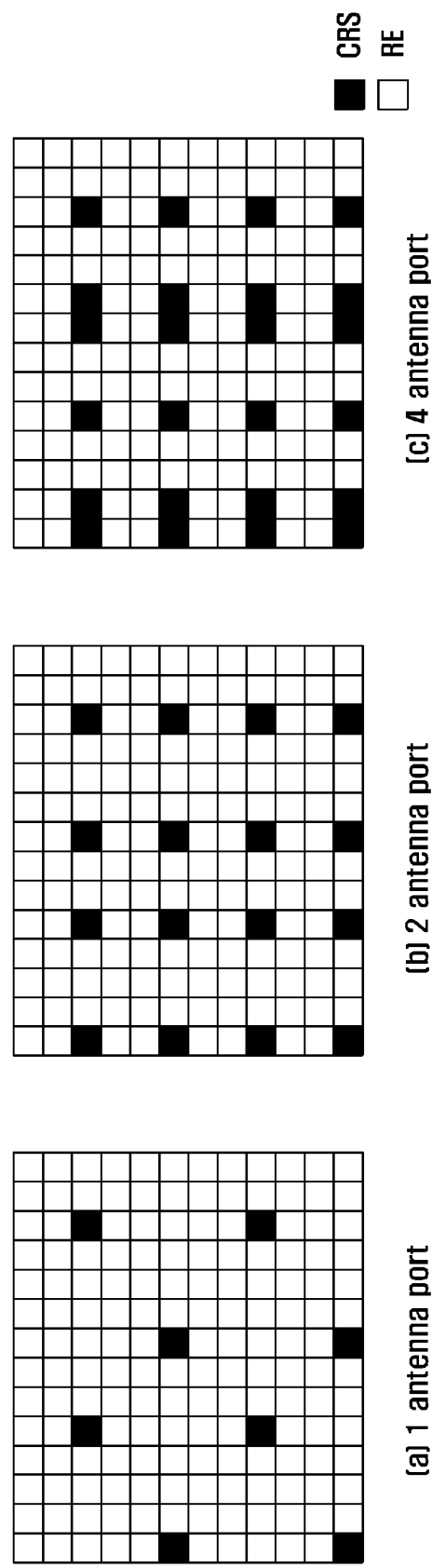
FIG. 1 is a diagram illustrating arrangements of common reference signals for use in a Long Term Evolution (LTE) system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

Transmission diversity is a technique used to improve reception performance by transmitting a signal on multiple channels to overcome multipath fading.

In a Long Term Evolution (LTE) system, Space Frequency Block Coding (SFBC) and Frequency Switched Transmit Diversity (FSTD) are used as transmission diversity techniques. In order to apply theses transmission diversity techniques, modulation symbols are assigned to each layer and precoded for transmission diversity, and then precoded symbols are mapped to resource elements. The precoded symbols are mapped to resource elements that are not occupied by a Physical Broadcast Channel (PBCH), a Synchronization signal, a Reference Signal, or a Physical Downlink Control Channel (PDCCH) of the resource block assigned to the corresponding User Equipment (UE). The precoded symbols are mapped in frequency-preferable order, i.e., from the first subcarrier of the first Orthogonal Frequency Division Multiplexing (OFDM) symbol in frequency direction and, if the resource of the first OFDM symbols are completely assigned, then from the first subcarrier of the resource block of the next OFDM symbol.

In an LTE-Advanced (LTE-A) system, positions of resource elements for transmitting LTE-A data due to the newly introduced DM-RS are different as compared to the LTE system. Accordingly, in case that the precoding and resource mapping designed for achieving the transmission diversity in the LTE system are applied to the LTE-A system without modification, the transmission performance degrades. The reason of the performance degradation is discussed herein.

As aforementioned, the 3$^{rd}$ Generation Partnership Project (3GPP) LTE system uses the SFBC and FSTD for transmission diversity under the assumption that 2 or 4 transmission antennas are used.

The SFBC is a frequency axis type of Space Time Block Code (STBC) which is also known as an Alamouti code. The SFBC is composed of orthogonal transmission diversion streams and designed to obtain optimum Signal to Noise Ratio (SNR) at a linear receiver. Such an orthogonal code exists only with two transmission antennas. In the LTE system, the SFBC transmission is configured as equation (1) such that the symbols are transmitted on a pair of adjacent subcarriers through two antenna ports.

$$\begin{bmatrix} y^{(0)}(1) & y^{(0)}(2) \\ y^{(1)}(1) & y^{(1)}(2) \end{bmatrix} = \begin{bmatrix} x_1 & x_2 \\ -x_2^* & x_1^* \end{bmatrix} \quad (1)$$

In equation (1), $y^{(p)}(k)$ denotes the symbol transmitted on the $k^{th}$ subcarrier at the $p^{th}$ antenna port.

The orthogonal code used in the SFBC does not exist for an antenna configuration higher than 2×2. In an LTE system using 4 transmission antennas, SFBC and FSTD are used in combination as shown in equation (2):

$$\begin{bmatrix} y^{(0)}(1) & y^{(0)}(2) & y^{(0)}(3) & y^{(0)}(4) \\ y^{(1)}(1) & y^{(1)}(2) & y^{(1)}(3) & y^{(1)}(4) \\ y^{(2)}(1) & y^{(2)}(2) & y^{(2)}(3) & y^{(2)}(4) \\ y^{(3)}(1) & y^{(3)}(2) & y^{(3)}(3) & y^{(3)}(4) \end{bmatrix} = \begin{bmatrix} x_1 & x_2 & 0 & 0 \\ 0 & 0 & x_3 & x_4 \\ -x_2^* & x_1^* & 0 & 0 \\ 0 & 0 & -x_4^* & x_3^* \end{bmatrix} \quad (2)$$

In order to demodulate in the wireless communication system, it is necessary to estimate the channel environment which the received signal has experienced. In 3GPP LTE and LTE-A, a Common Reference Signal (CRS) and a Demodulation Reference Signal (DM-RS) are used for this purpose.

FIG. 1 is a diagram illustrating arrangements of common reference signals for use in an LTE system according to an exemplary embodiment of the present invention.

Referring to FIG. 1, the CRS is a reference signal transmitted to all UEs within the cell of a corresponding evolved Node B (eNB) in an LTE system. The CRS is used for creating channel state information and demodulating the received signal. As shown in parts (a), (b), and (c) of FIG. 1, the Resource Blocks (RBs) are designed differently depending on the number of antenna ports, and each RB includes the Resource Elements (REs) carrying the CRSs.

FIG. 2 is a diagram illustrating arrangements of Demodulation Reference Signals (DM-RS) for use in an LTE-A system according to an exemplary embodiment of the present invention.

Referring to FIG. 2, the DM-RS is transmitted as precoded per resource block in separation from the channel state information demodulation signal and distinguished between transmission layers so as to be capable of being used with multiple antennas and demodulated by the UE assigned the corresponding resource block and corresponding layer transmission. The DM-RS is used to demodulate the received signal. Parts (a) and (b) of FIG. 2 show the RBs for different numbers of antenna ports, and each resource block includes the REs carrying the DM-RSs.

As shown in FIGS. 1 and 2, the change of the positions of the REs carrying the CRS and DM-RS causes the change of the REs carrying data on the PDCCH in the LTE and LTE-A systems.

A description is made of the arrangement of REs carrying the precoded symbols hereinafter.

In the LTE system, the modulation symbols are precoded and then mapped to the REs of the RB assigned to a corresponding UE. At this time, the precoded symbols are mapped to the REs of the RB according to the following rules.

First, the precoded symbols are not mapped to RBs carrying a PBCH, a synchronization signal, or a reference signal.

Second, the precoded symbols are not mapped to OFDM symbols of a control channel such as a PDCCH.

Under these rule, the resource allocation is performed starting from the subcarrier having the lowest index in the first OFDM symbol by incrementing the subcarrier index. If reaching the subcarrier with last index in the assigned RB, the resource allocation restarts from the subcarrier with lowest index in the next OFDM symbol. That is, the resource allocation is performed in units of RE from bottom to top and from left to right.

In the LTE system, the precoded symbols are mapped to an RB in frequency-preferable order as described above.

Figure 3:
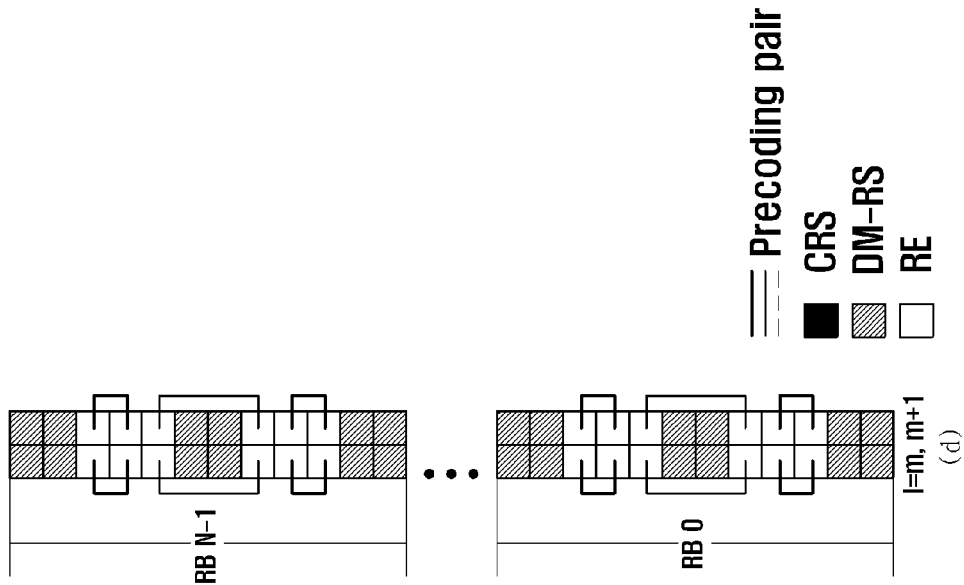
FIGS. 3 and 4 are diagrams illustrating arrangements of precoded symbols mapped to Resource Elements (REs) in a communication system according to the related art.
Figure 4:
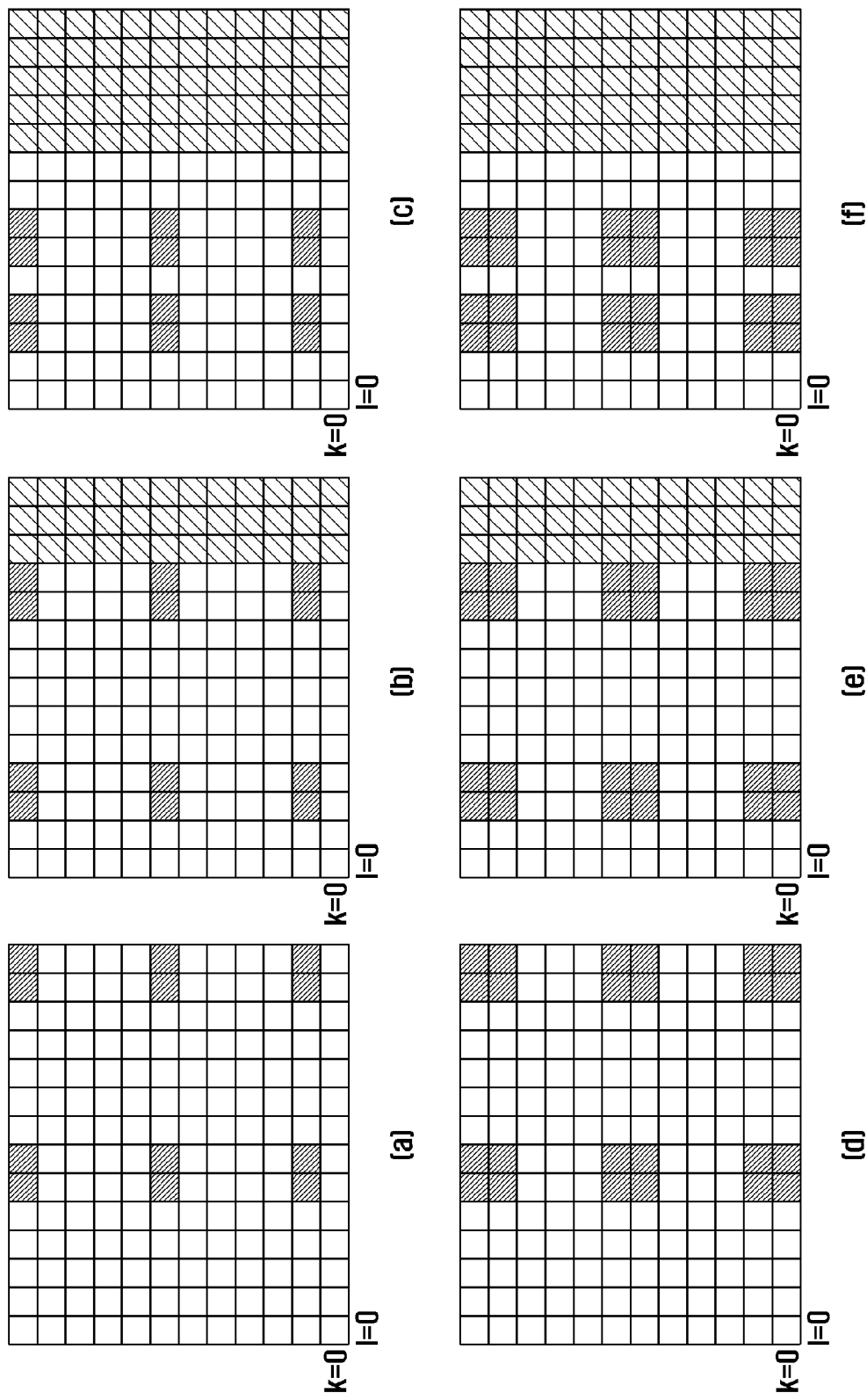

FIGS. 3 and 4 are diagrams illustrating arrangements of precoded symbols mapped to REs in a communication system according to the related art.

Referring to FIGS. 3 and 4, the precoded symbols are mapped to the REs in the aforementioned process. In the example of FIGS. 3 and 4, it is assumed that the RB assigned to the receiver is composed of n subcarriers. For simplicity, the subcarriers are indexed with 0 to n−1 from bottom to top such that the precoded symbols are mapped in this order in the RB. Also, the OFDM symbols are indexed in order of m and m+1 from left to right such that the precoded symbols are mapped in this order.

In the LTE system, transmission diversity is based on the SFBC. Accordingly, in order to apply transmission diversity, the number of precoded symbols must be twice the number of REs. Also, according to the basic assumption for applying the SFBC, the paired symbols have to experience the same or very similar channel environments. Accordingly, it is preferred to map the paired symbol to the adjacent REs. Part (a) of FIG. 3 shows an exemplary case where the paired symbols are arranged in an OFDM symbol carrying CRS. In more detail, the precoded symbols are mapped to the REs in order, avoiding the subcarriers (indexed by 0, 3, 6, 9, . . . , n−12, n−9, n−6, and n−3) carrying the CRSs, in the second OFDM symbol indexed by m+1. The dotted lines and solid lines indicate pairing of the precoded symbols. In this manner, the LTE system arranges the SFBC-precoded paired symbols on the adjacent subcarriers.

Although the CRS of the LTE system is still used, a new reference signal, i.e. DM-RS, is introduced in the LTE-A system. With the use of the new reference signal, the transmission diversity and resource mapping designed for the LTE system cannot be applied to the LTE-A system without degradation of demodulation performance. This is because the number of empty REs that can be mapped to the precoded symbols is an odd number in one OFDM symbol. A more detailed description is made herein with reference to parts (b), (c), and (d) of FIG. 3.

Parts (b) and (c) of FIG. 3 show exemplary cases of an LTE-A system in which the precoded symbols are mapped to available REs in the same manner as the LTE system when a number of resource blocks is odd and even, and with the number of antenna ports being less than or equal to 2. Part (d) of FIG. 3 shows an exemplary case of precoded symbols mapped to available REs in the same manner as the LTE system when a number of antenna ports is equal to or less than 3. Here, the SFBC precoded paired symbols are connected through solid or dotted lines.

In case that an odd number of RBs is assigned, when the SFBC-precoded symbols are mapped in the same manner as the LTE system, the SFBC-precoded symbol arranged on the last available subcarrier in the first OFDM symbol carrying the DM-RSs is paired with the SFBC-precoded symbol arranged on the first available subcarrier in the following-OFDM symbol carrying the DM-RSs, resulting in difficulty of correct demodulation. As shown in part (b) of FIG. 3, the paired symbols mapped to the RE (m, n−2) defined on the second last subcarrier in the first OFDM symbol and the RE (m+1, 0) on the first subcarrier in the second OFDM symbol are likely to incur an error in demodulation process. The two paired symbols are connected through a dotted line.

Meanwhile, even though there is an even number of empty REs in the OFDM carrying the DM-RSs, if the empty REs are continuous and the number of empty REs is not a square of 2 as in the case where two resource blocks are assigned or the number of antenna ports is three, the paired symbols are spaced apart by as many as 1 or more subcarriers on the frequency axis, resulting in degradation of SFBC demodulation performance. This problem occurs regardless of the number of assigned resource blocks or the number of antenna ports. The RE pair {(m, 0), (m, 2)} in part (a) of FIG. 3, the RE pairs {(m, 0), (m, 2)} and {(m+1, 0), (m+1, 2)} in part (c) of FIG. 3, and the RE pairs { (m, 4), (m, 7)} and { (m+1, 4), (m+1, 7)} in part (d) of FIG. 3 are the representative examples.

As aforementioned, the reason why the performance degradation of the transmission diversity occurs in the LTE-A system is because the SFBC-precoded paired symbols are not arranged on adjacent resource elements due to the newly introduced DM-RS.

A description is made of a method for arranging precoded paired symbols according to an exemplary embodiment of the present invention hereinafter.

According to exemplary embodiments of the present invention, two approaches are proposed to address the aforementioned problem. The first is to reselect the precoded paired symbols. The second is to change the order of arrangement of the precoded symbols. The former approach is described as the first exemplary embodiment, and the latter approach as the second exemplary embodiment.

First Exemplary Embodiment

FIGS. 5 to 11 are diagrams illustrating a principle of a method for mapping precoded symbol pairs to resource elements according to the first exemplary embodiment of the present invention.

In order to simplify the explanation, FIGS. 5 to 11 are depicted under the assumption that the number of subcarriers in an OFDM symbol of a resource block assigned, by a transmitter, to a receiver is n, which is similar to the description with reference to FIGS. 3 and 4. The subcarriers are indexed from bottom to top of the resource block in order of 0 to n−1. Meanwhile, the OFDM symbols are indexed from left to right in order of m and m+1.

The symbol mapping method according to the first exemplary embodiment can include three schemes: 1) muting some subcarriers so as to not carry data symbols, 2) transmitting symbols that are not SFBC-precoded on some subcarriers, and 3) precoding between adjacent OFDM symbols on some subcarriers.

First, a description is made of an exemplary method of muting some subcarriers so as to not carry data symbols.

In case of SFBC, if the channels experienced by the paired symbols are spaced far apart, a demodulation error is likely to occur. In that case, the erroneously-demodulated symbol causes performance degradation in turbo code decoding. Accordingly, exemplary embodiments of the present invention propose a method for muting transmission of data symbols at a specific position to avoid errors caused by paired symbols that are far-apart.

Figure 5:
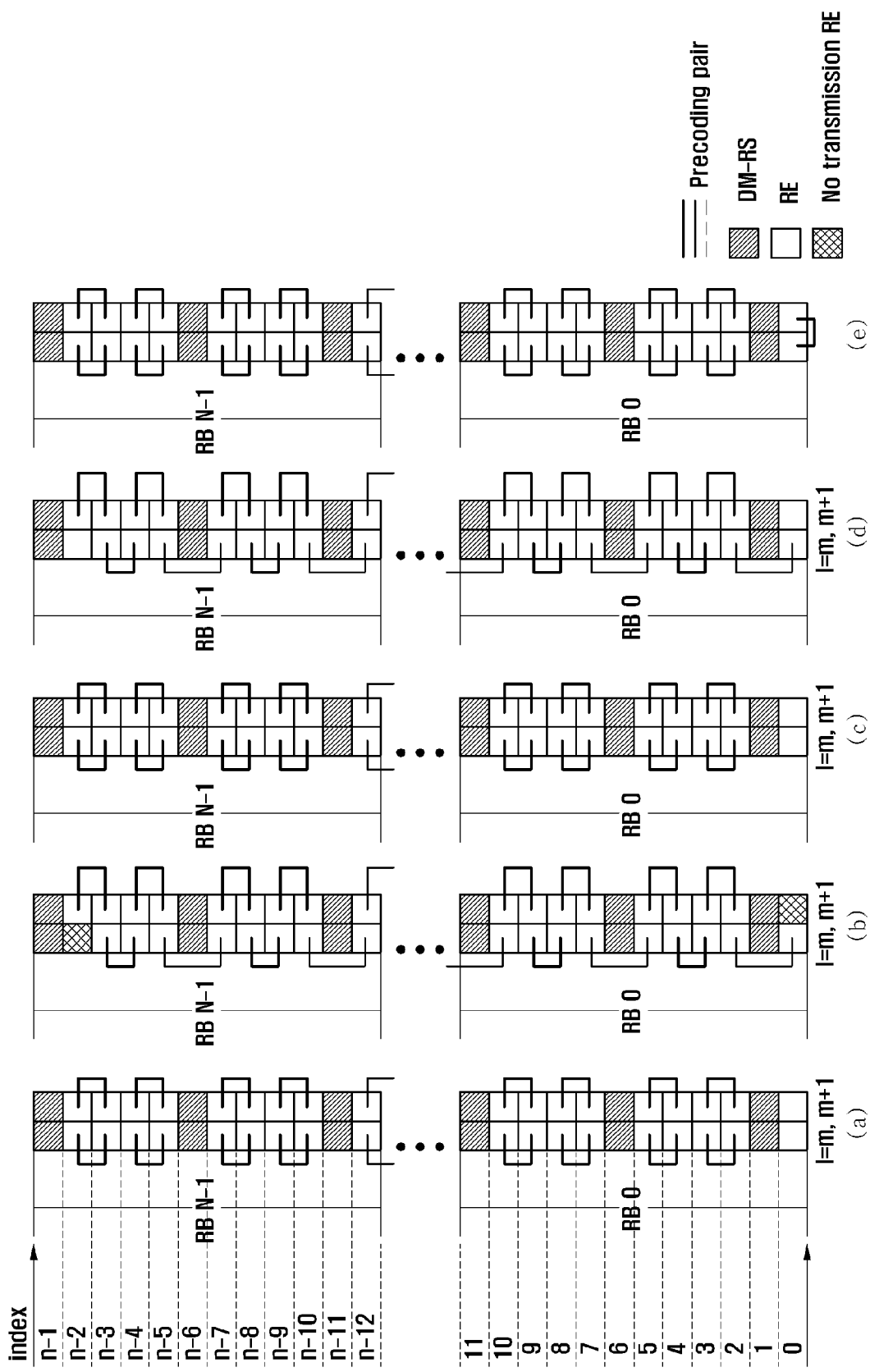
FIGS. 5 to 11 are diagrams illustrating a principle of a method for mapping precoded symbol pairs to resource elements according to a first exemplary embodiment of the present invention.

Referring to parts (a) and (b) of FIG. 5, when the number of antenna ports is equal to or less than 2 and the number of assigned resource blocks is an odd number, the transmitter may not map any data symbol to one resource element in every OFDM symbol carrying the DM-RS in the assigned resource blocks. As shown in FIG. 5, no data symbol is mapped to the resource elements (m, 0) and (m+1, 0) of part (a) and the resource elements (m, n−2) and (m+1, 0) of part (b). By configuring such that a number of subcarriers carrying the SFBC-precoded data symbols in the range of an assigned resource block becomes an even number in the aforementioned manner, the demodulation error caused by the paired symbols that are far-apart can be avoided.

Here, the position at which the corresponding subcarrier is to be muted can be placed at any of the empty resource elements that are not carrying the reference signals, PBCH, or synchronization signals, in the range of the assigned resource block, in every OFDM symbol carrying the DM-RSs rather than fixed as in parts (a) and (b) of FIG. 5. Different subcarriers can be selected to be muted in the OFDM symbols having the DM-RSs.

Figure 6:
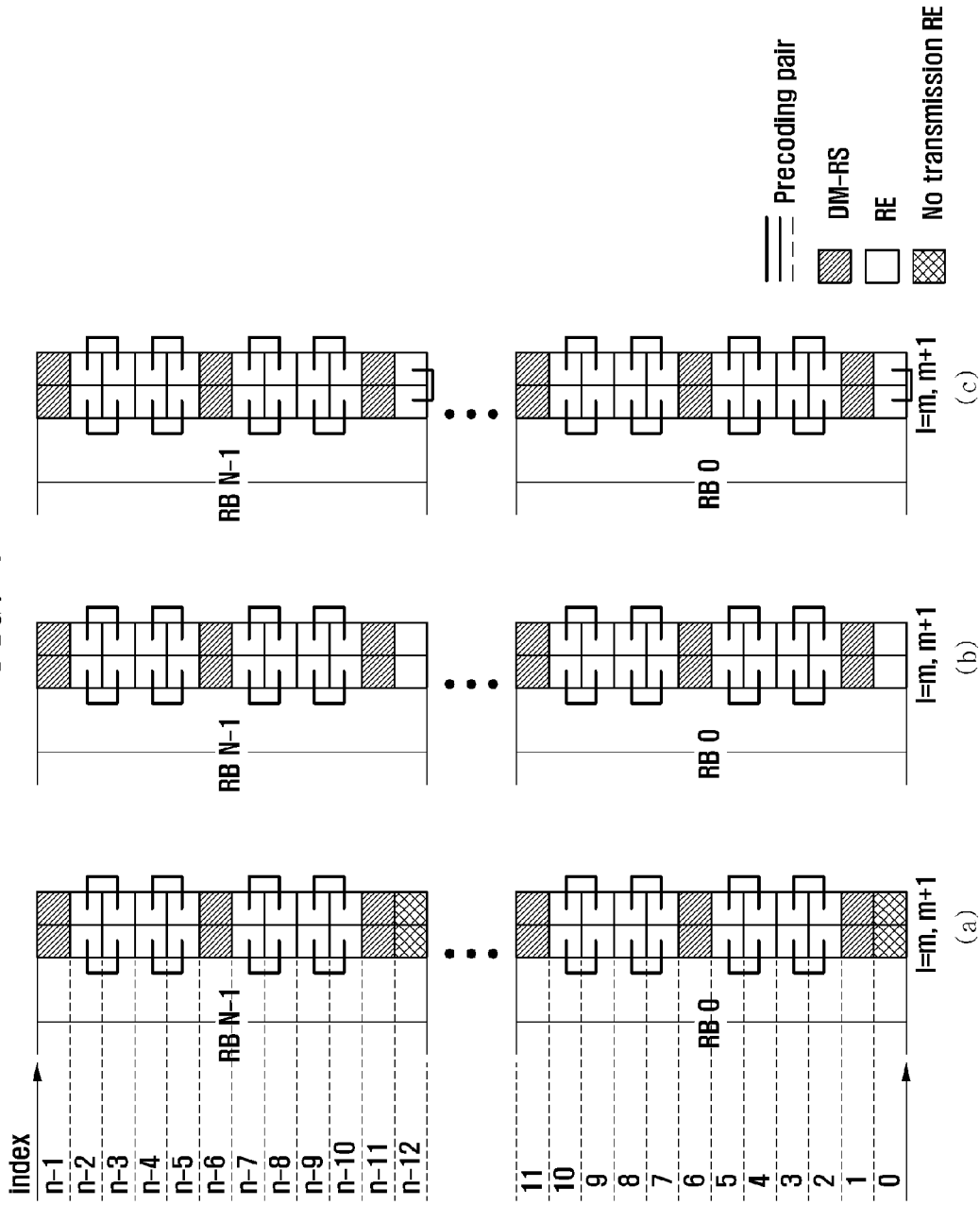

Referring to part (a) of FIG. 6, when the number of antenna ports is equal to or less than 2, the transmitter can mute a subcarrier with the lowest index in every OFDM symbol carrying the DM-RS per resource block regardless of the number of assigned resource blocks. In part (a) of FIG. 6, the resource elements (m, 0) and (m+1, 0) are muted such that data symbols are not transmitted in these resource elements.

Figure 7:
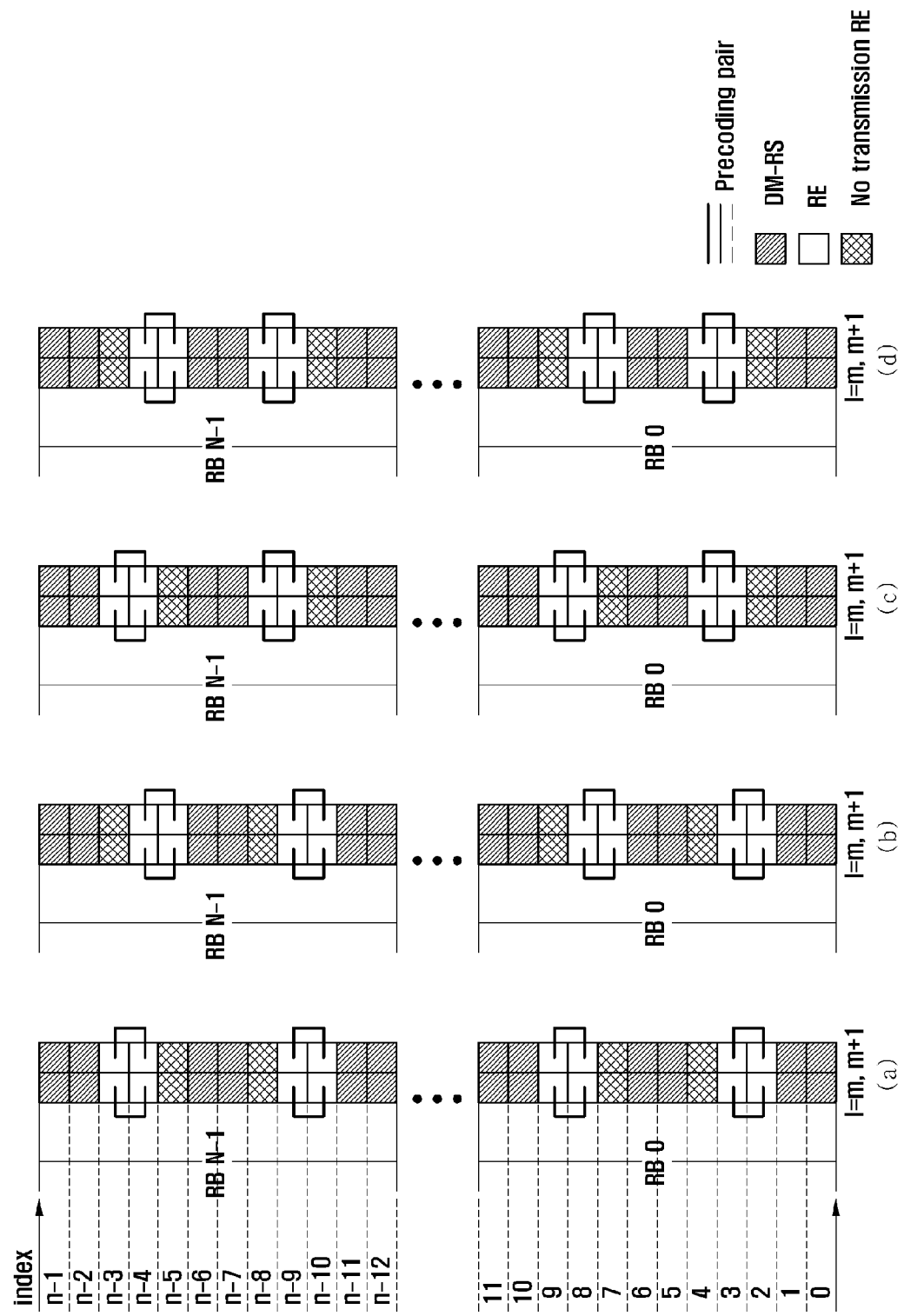
Figure 8:
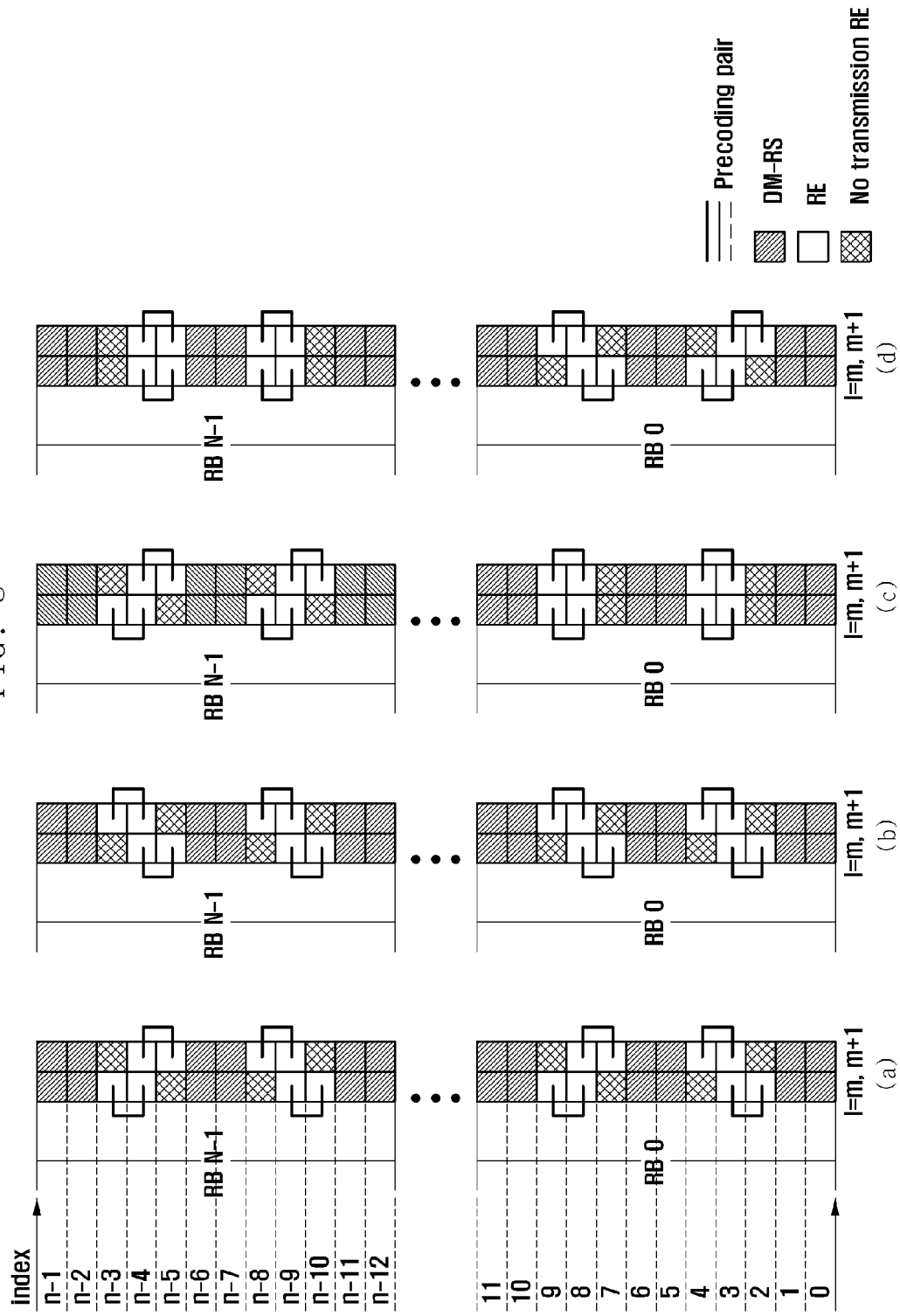

Referring to FIGS. 7 and 8, when the number of antenna ports is equal to or greater than 3, the transmitter can mute the same subcarrier across the two OFDM symbols between the two pairs of code-division multiplexed reference groups regardless of the number of assigned resource blocks so as to prevent the demodulation error and remove the cause of the decoding performance degradation problem.

As show in FIG. 7, the muting can be placed on the same subcarrier in two contiguous OFDM symbols carrying the DM-RS. For example, in part (a) of FIG. 7, the resource elements (m, 4) and (m+1, 4) are positioned on the same subcarrier.

As shown in FIG. 8, the muting can be placed on different subcarriers in two contiguous OFDM symbols. For example, in part (a) of FIG. 8, the resource elements (m, 4) and (m+1, 2) are positioned on different subcarriers. Also, the muting can be placed on the same subcarrier in the same resource block and on different subcarriers in a different resource block. For example, in part (c) of FIG. 8, the resource elements (m, 2) and (m+1, 2) are placed at the same positions in a resource block (RB 0) and, also in part (c) of FIG. 8, the resource elements (m, n−5) and (m+1, n−3) are placed at different positions in the different resource block (RB N−1).

However, the position of the subcarrier on which the muting is placed is not limited to the cases as shown in FIGS. 7 and 8. That is, the method includes all the combinations fulfilling the conditions that only one subcarrier, except for the two contiguous subcarriers between the two pairs of code-division multiplexed DM-RSs groups, is muted.

In all the aforementioned methods, the muted subcarrier can carry any of Channel State Information Reference Signal (CSI-RS) and other control signal (except for the data symbol) or not.

At least one of the subcarrier muting methods can be supported by the LTE-A system. In case that two or more methods are supported, it is required to notify the receiver of the method to be used using a physical layer control signal or an upper layer control signal. With the notification about the muting method to be used, the receiver knows the muted positions and the positions on which other signals are transmitted as well as the precoded symbol positions.

At this time, if a signal other then the precoded symbol is transmitted at the corresponding position, the receiver performs demodulation on the resource elements only at the corresponding position with the method appropriate for the corresponding signal and on resource elements carrying precoded data symbols separately. In case that nothing is transmitted, the corresponding position is set to 0 so as to be demodulated along with the precoded data symbols or excluded when the precoded data symbols is demodulated.

Second, a description is made of an exemplary method for transmitting symbols that are not SFBC-precoded on some subcarriers.

In SFBC, the precoded paired symbols that are spaced far apart causes demodulation error. Moreover, the erroneously demodulated symbols result in performance degradation for turbo code decoding. In order to prevent the demodulation error, exemplary embodiments of the present invention propose a method for transmitting data symbols that are not SFBC-precoded at specific positions.

Referring to parts (c) and (d) of FIG. 5, when the number of antenna ports is equal to or less than 2 and an odd number of resource blocks is assigned, the transmitter can transmit a non-precoded data symbol on one resource element in every OFDM symbol carrying the DM-RS. That is, the resource elements (m, 0) and (m+1, 0) in part (c) of FIG. 5 and the resource elements (m, n−2) and (m+1, 0) in part (d) of FIG. 5 can be used to transmit the non-precoded data symbols. By configuring such that a number of subcarriers carrying the SFBC-precoded data symbols in the range of an assigned resource block becomes an even number in the aforementioned manner, the demodulation error caused by the paired symbols that are far-apart can be avoided.

Here, the position at which the corresponding subcarriers is to be used to carry the non-precoded symbol can be placed at any of the empty resource elements that are not carrying the reference signals, PBCH, or synchronization signals, in the range of the assigned resource block, in every OFDM symbol carrying the DM-RSs rather than fixed as in parts (c) and (d) of FIG. 5. Different subcarriers can be selected to carry the non-precoded data symbols in the OFDM symbols having the DM-RSs.

The following description illustrates a situation when the number of antenna ports is equal to or less than 2 and the number of assigned resource blocks is not important.

Referring to part (b) of FIG. 6, when the number of antenna ports is equal to or less than 2, the transmitter can transmit the non-SFBC-precoded data symbol on one subcarrier having the lowest index, per resource block, in every OFDM symbol having the DM-RSs. That is, the resource elements (m, 0) and (m+1, 0) in part (b) of FIG. 6 can be used to carry the non-SFBC-precoded data symbols. In this manner, it is possible to avoid the demodulation error and decoding performance degradation.

The following description illustrates a situation when the number of antenna ports is equal to or greater than 3 and the number of assigned resource blocks is not important.

Figure 9:
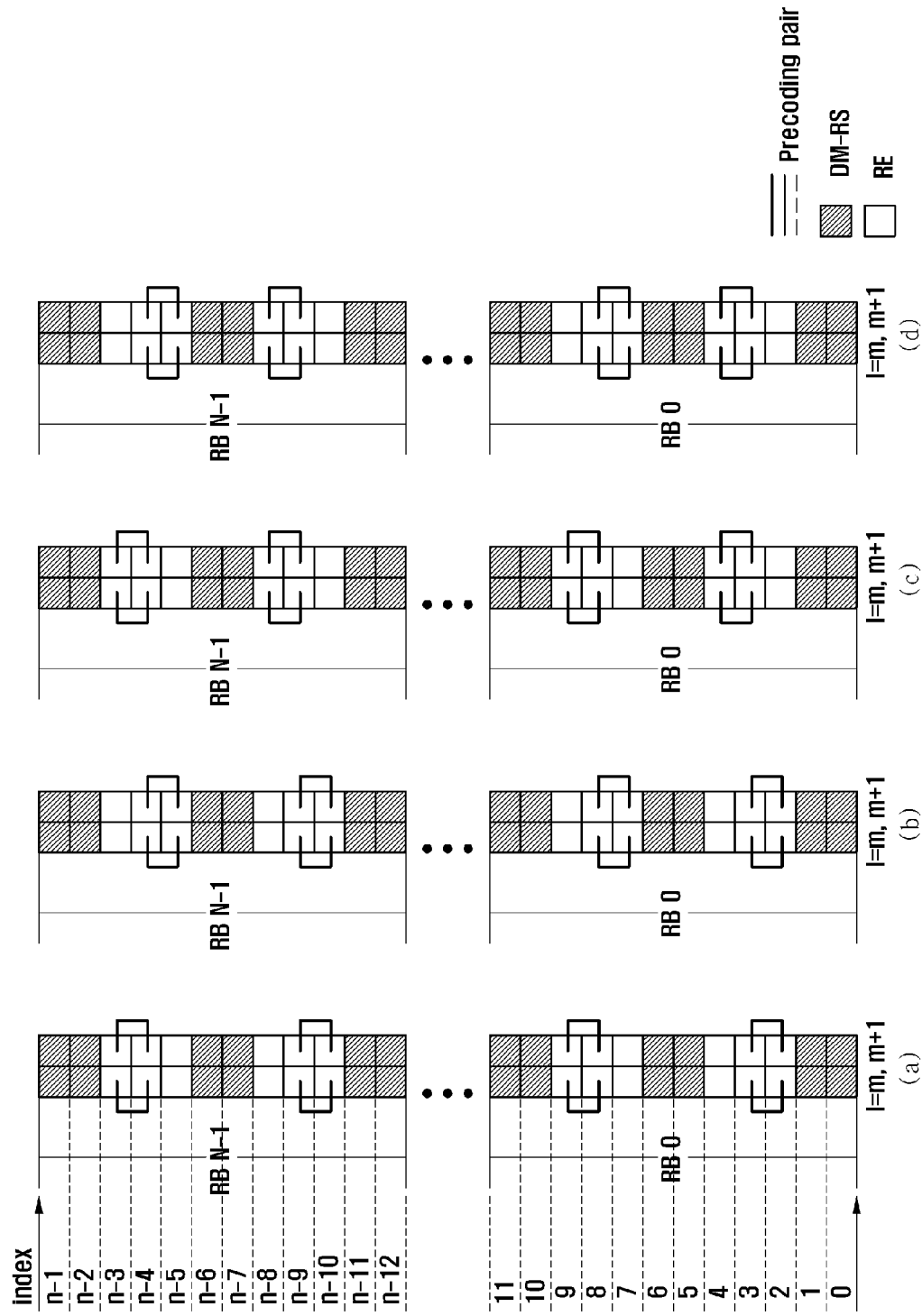
Figure 10:
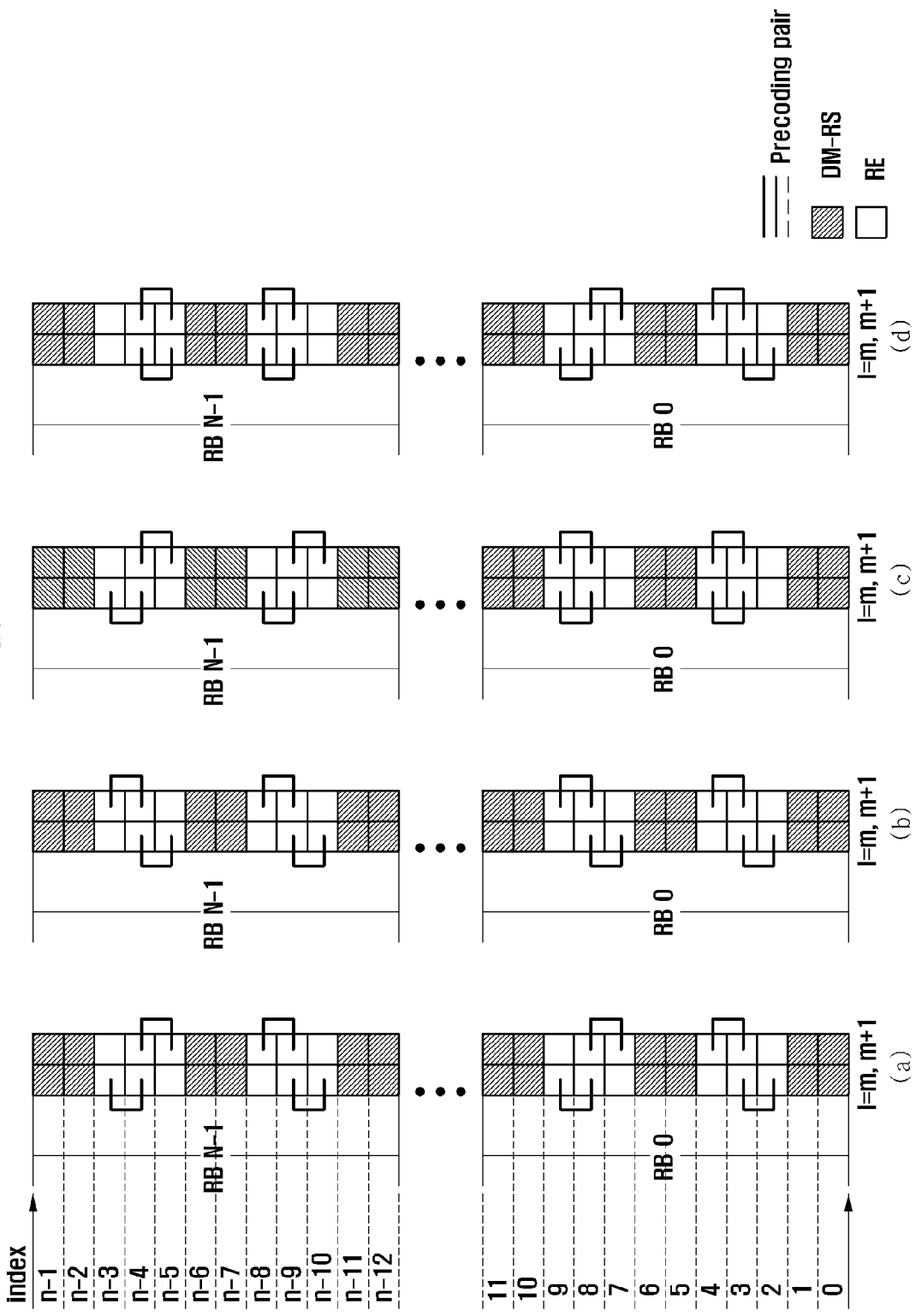

Referring to FIGS. 9 and 10, when the number of antenna ports is equal to or greater than 3, the transmitter can transmit the non-SFBC precoded data symbols on the subcarrier in two contiguous OFDM symbols having the DM-RSs between two pairs of code division multiplexed DM-RS groups in the range of the assigned resource block. In this manner, it is possible to improve the decoding performance.

The positions of the resource elements carrying the non-SFBC-precoded data symbols can be placed on the same subcarrier in two contiguous OFDM symbols having the DM-RSs as shown in FIG. 9. For example, the resource elements (m, 4) and (m+1, 4) in part (a) of FIG. 9 illustrate such a case.

Referring to FIG. 10, the subcarrier index of the resource element carrying the non-precoded data symbol can be changed in the OFDM symbols as the resource elements (m, 4) and (m+1, 2) illustrate in part (a) of FIG. 10. Furthermore, the subcarrier index of the resource element carrying the non-precoded data symbol may not be changed as the resource elements (m, 2) and (m+1, 2) in resource block (RB 0) of part (c) illustrate, or may be changed as the resource elements (m, n−5) and (m+1, n−3) in the resource block (RB N−1) of part (c) illustrate.

However, the positions of the subcarriers for carrying the non-precoded data symbols are not limited to the configurations as depicted in FIGS. 9 and 10. That is, the exemplary method includes all the combinations fulfilling the conditions that only one subcarrier, except for the two contiguous subcarriers between the two pairs of code-division multiplexed DM-RSs groups, is used to carry the non-SFBC-precoded data symbol.

At least one of the aforementioned exemplary methods for transmitting the non-SFBC-precoded data symbols can be supported in the LTE-A system. In the case that two or more methods are used, the method to be applied is notified to the receiver by means of a physical layer control signal or an upper layer control signal. With the notification about the method to be used, the receiver knows the positions of the non-SFBC-precoded data symbols so as to perform SFBC decoding on the remaining SFBC-precoded symbols.

Third, a description is made of an exemplary method of precoding across OFDM symbols on some subcarriers.

In case of SFBC, if the channels experienced by the paired symbols are spaced far apart, a demodulation error is likely to occur and, the erroneously-demodulated symbol causes performance degradation in turbo code decoding. Accordingly, exemplary embodiments of the present invention propose a method for precoding data symbols in adjacent OFDM symbols rather than in the same OFDM symbol.

The following description illustrates a situation when the number of antenna ports is equal to or less than 2 and an odd number of resource blocks are assigned.

Referring to part (e) of FIG. 5, when the number of antenna ports is equal to or less than 2 and an odd number of resource blocks is assigned, the transmitter can perform precoding of the data symbols into the resource elements of the adjacent OFDM symbols having the DM-RS rather than into the resource elements of the same OFDM symbol. For example, the transmitter may perform precoding of the data symbols into the resource elements (m, 0) and (m+1, 0) of two adjacent OFDM symbols as shown in part (e) of FIG. 5 so as to be paired. By configuring such that a number of subcarriers carrying the SFBC-precoded data symbols in the range of an assigned resource block becomes an even number in the aforementioned manner, the demodulation error caused by the paired symbols that are far-apart can be avoided.

The following description illustrates a situation when the number of antenna ports is equal to or less than 2 and the number of assigned resource blocks is not important.

Referring to part (c) of FIG. 6, when the number of antenna ports is equal to or less than 2, regardless of the number of assigned resource blocks, the eNB can perform precoding on the data symbols into the resource elements of two different OFDM symbols, rather than the same OFDM symbol, having the DM-RSs on the subcarrier having the lowest index in the range of the assigned resource block. That is, the transmitter performs precoding of the data symbols into the resource elements (m, 0) and (m+1, 0) and the resource elements (m, n−12) and (m+1, n−12) of two adjacent OFDM symbols so as to be paired, respectively. In this manner, the demodulation error and decoding performance degradation problem can be addressed The following description illustrates a situation when the number of antenna ports is equal to or greater than 3 and the number of assigned resource blocks is not important.

Figure 11:
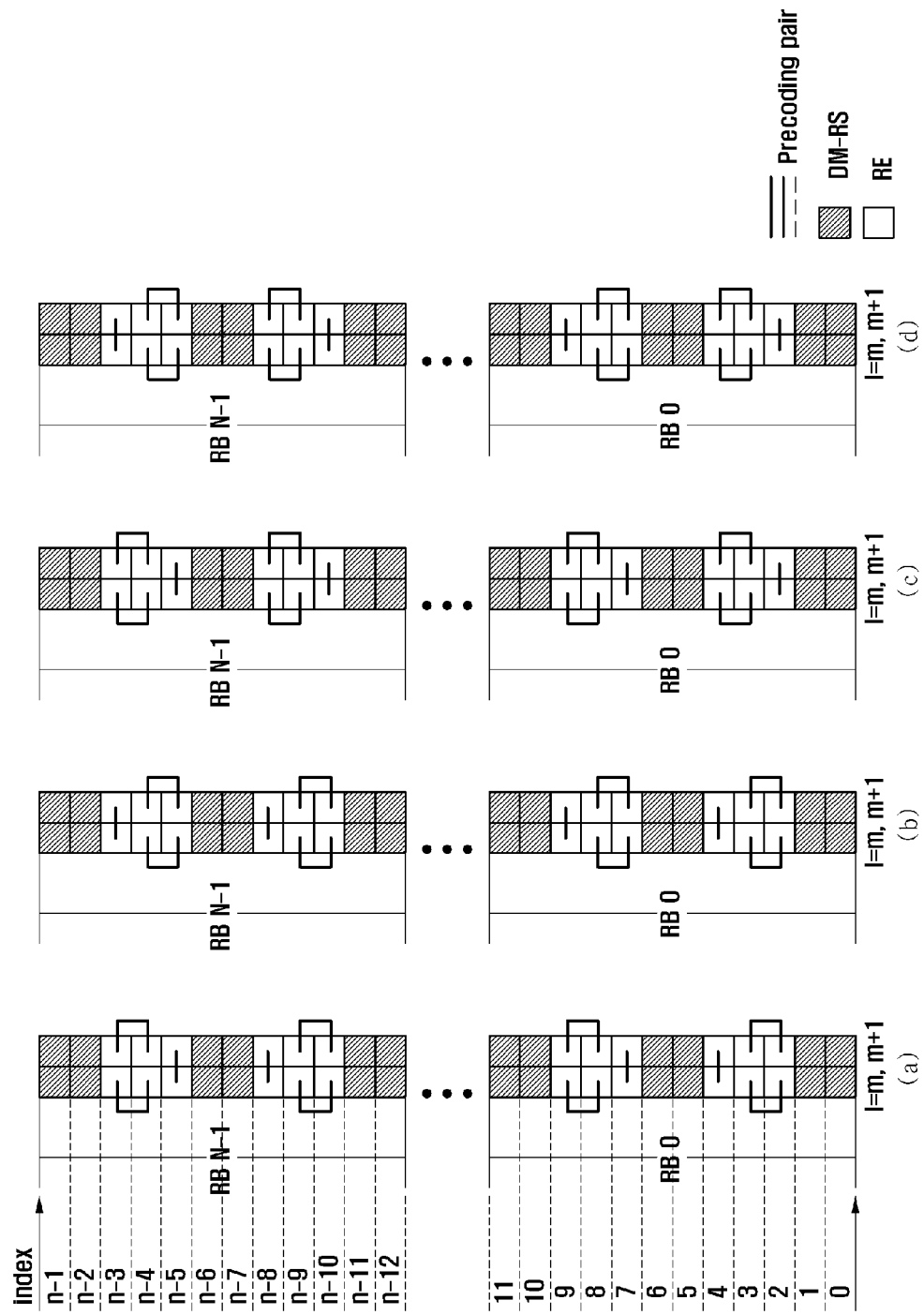

Referring to FIG. 11, when the number or antennas is equal to or greater than 3, regardless of the number of assigned resource blocks, the transmitter can perform precoding on the data symbols into the resource elements of two different OFDM symbols, rather than the same OFDM symbol, having the DM-RSs on the same subcarrier, between two pairs of code division multiplexed DM-RS groups, in the range of the assigned resource block. In this manner, the decoding performance can be improved. For example, the data symbols are precoded into the resource elements (m, 4) and (m+1, 4) so as to be paired as shown in parts (a) and (b) of FIG. 11.

Here, the positions into which the data symbols are precoded in two adjacent OFDM symbols are not limited to those depicted in FIG. 11. That is, the exemplary method includes all the combinations fulfilling the conditions that, except for the two contiguous subcarriers between the two pairs of code-division multiplexed DM-RSs groups, the data symbols are precoded into the resource elements of the two contiguous OFDM symbols on the same subcarriers.

At least one of the aforementioned methods for precoding across OFDM symbols on some subcarriers can be supported in the LTE-A system. In case that more than one precoding method is supported, the precoding method to be applied is notified to the receiver by means of a physical layer control signal or an upper layer control signal. With the notification about the precoding method to be used, the receiver knows where the SFBC precoding has been applied across two adjacent OFDM symbols rather than in the same OFDM symbol. Accordingly, the receiver can decode the precoded symbols correctly into the data symbols.

Second Exemplary Embodiment

Figure 12:
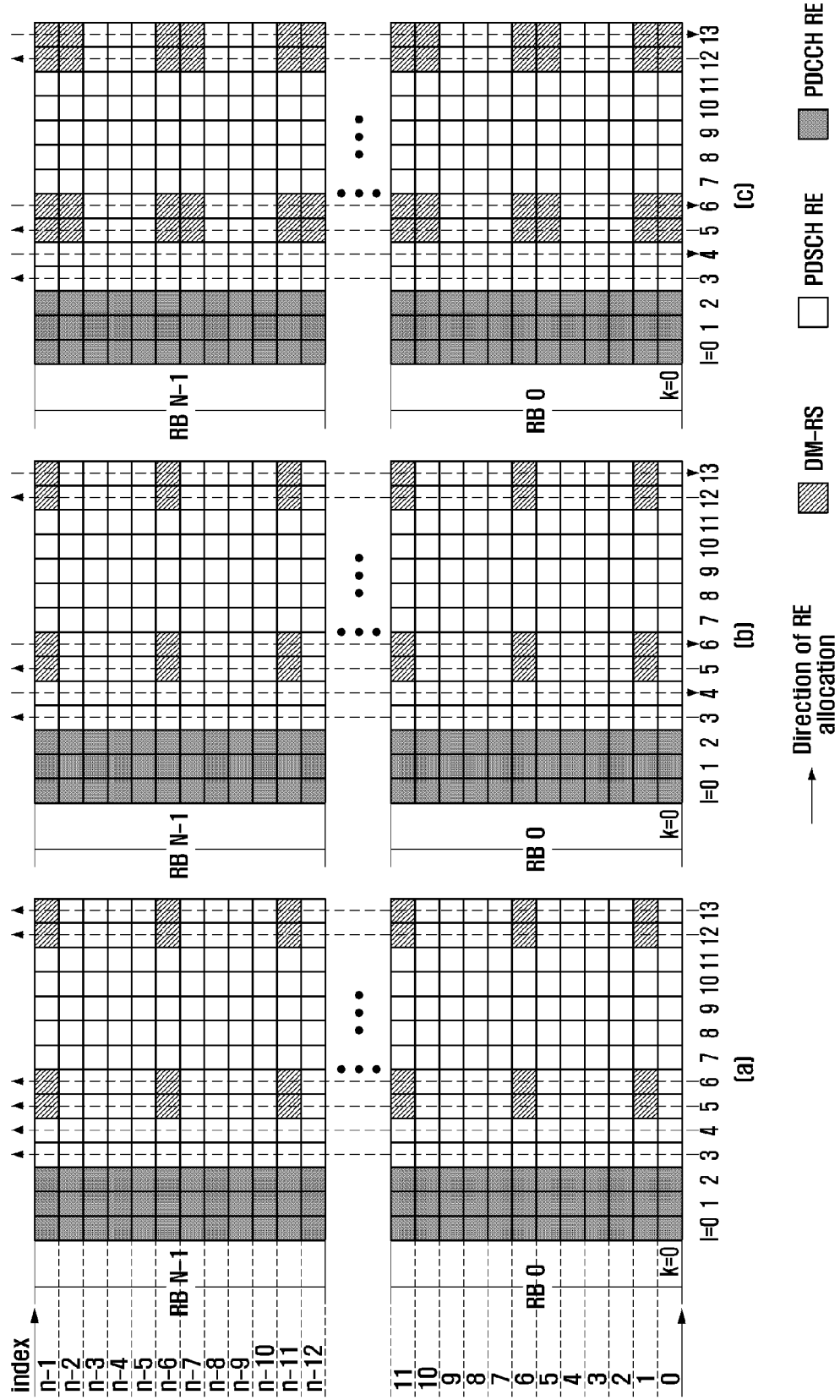
FIGS. 12 and 13 are diagrams illustrating arrangements of precoded symbols mapped to REs in Resource Blocks (RBs) according to a second exemplary embodiment of the present invention.
Figure 13:
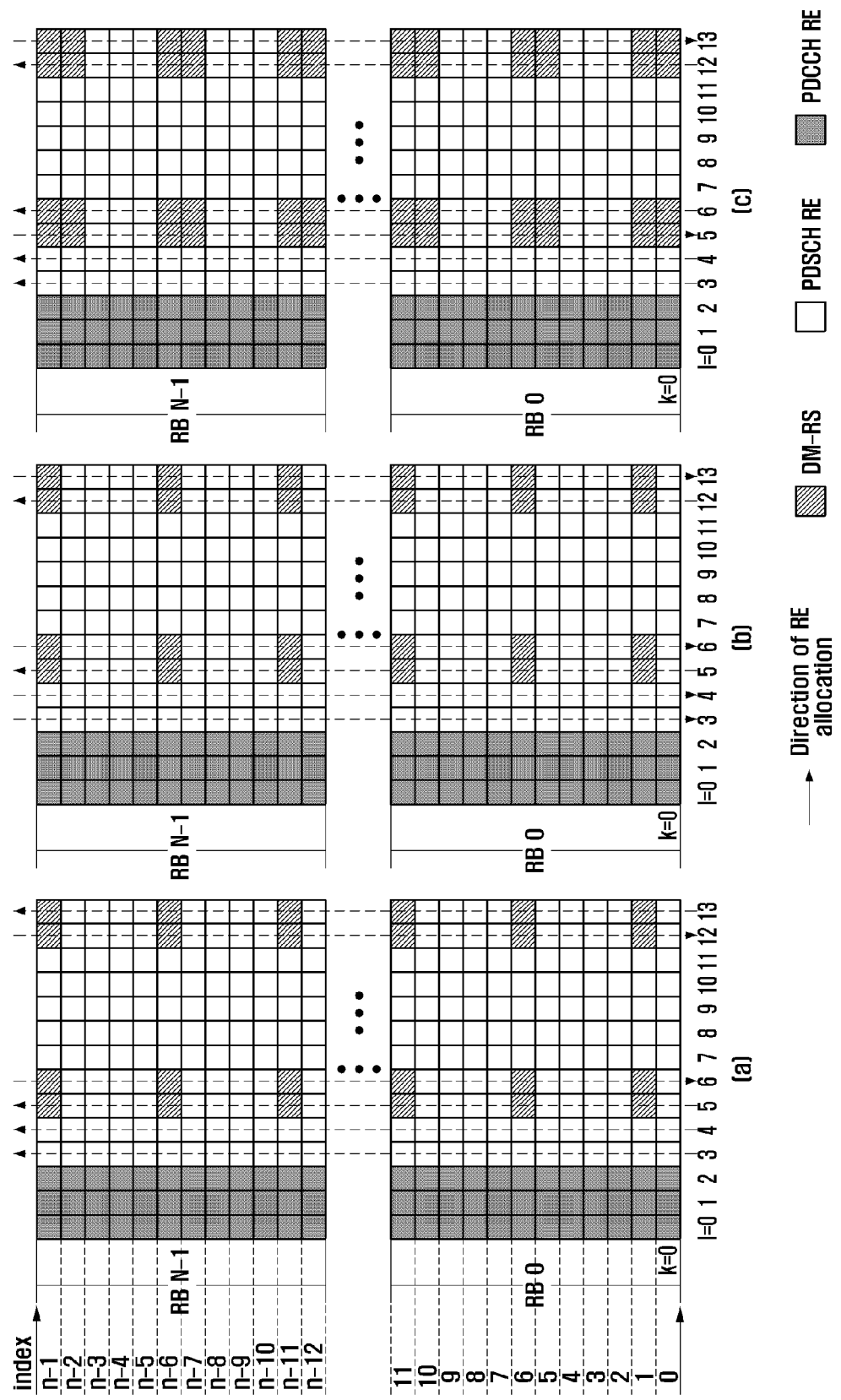

FIGS. 12 and 13 are diagrams illustrating arrangements of precoded symbols mapped to REs in RBs according to a second exemplary embodiment of the present invention.

In order to simplify the explanation, FIGS. 12 and 13 are depicted under the assumption that the number of subcarriers of a single OFDM symbol of an RB assigned, by the transmitter, to the receiver is n and one RE is composed of 14 OFDM symbols. The subcarriers are indexed from bottom to the top of the resource block in order of 0 to n−1. Meanwhile, the OFDM symbols are indexed from left to right in order of 0 to 13. That is, the subcarriers and the OFDM symbols are indexed in ascending order from 0.

Among the two aforementioned problems, the first problem is likely to be more significant in view of the performance degradation per resource element. In order to address the first problem, exemplary embodiments of the present invention propose a resource mapping method different from the resource mapping method used in the convention LTE system.

The new resource mapping method for the LTE-A system is performed under following conditions.

First, the PDSCH data symbols are not mapped to the positions carrying PBCH, synchronization signals, and reference signals.

Second, the PDSCH data symbols are not mapped in the OFDM symbols carrying PDCCH.

The resources are assigned under these conditions.

Part (a) of FIG. 12 shows the arrangement of resource elements in a conventional LTE system and parts (b) and (c) of FIG. 12 show the arrangements of resource elements according to an exemplary embodiment of the present invention. As shown in FIG. 12, the resource mapping method according to an exemplary embodiment of the present invention assigns the resource in an alternating or zigzag manner, i.e., in ascending order of the subcarrier index in one OFDM symbol and then in descending order of the subcarrier index in next OFDM symbol. The dotted arrows show the direction of the resource assignment.

Referring to parts (b) and (c) of FIG. 12, resource assignment starts from the first subcarrier having the lowest index in the first OFDM symbol following the control region (0, 3). If the resource assignment has been completed to the subcarrier having the highest index in the OFDM symbol (n−1, 3), the resource assignment restarts from the subcarrier having the highest index in the next OFDM symbol (n−1, 4) to the subcarrier having the lowest index (0, 4). If the resource assignment has been completed to the subcarrier having the lowest index in the OFDM symbol, the resource assignment restarts from the subcarrier having the lowest index in the next OFDM symbol (0, 5) to the last subcarrier and this is repeated until reaching last OFDM symbol of the resource block.

Although the resource assignment starts in ascending order first in parts (a) and (b) of FIG. 12, the present invention is not limited thereto, i.e., the resource assignment can also start in descending order.

Referring to FIG. 13, the resource assignment direction is not changed for the OFDM symbols having no DM-RS. As indicated by the dotted arrows in FIG. 13, the resource assignment direction is changed for the OFDM symbols having the DM-RS.

As shown in part (a) of FIG. 13, in OFDM symbols having no DM-RSs, the precoded symbols are assigned a resource from the RE (0, 3) to the RE (n−1, 3) and then from the RE (0, 4) to the RE (N−1, 4) in ascending order. Next, in the OFDM symbols having DM-RSs, the precoded symbols are assigned a resource from the RE (0, 5) to the RE (n−1, 5) in ascending order and then from the RE (n−1, 6) to the RE (0, 6) in descending order.

Also, exemplary embodiments of the present invention include the method fulfilling the conditions that the resource assignment is performed in an identical direction in the OFDM symbols having no DM-RS in any configuration different from that shown in FIG. 13, but in opposite directions in the two contiguous OFDM symbols having DM-RSs.

In the LTE-A system, the resource mapping can be performed only with a new resource assignment method or with a new resource assignment method and a conventional resource assignment method selectively depending on the implementation. In case that both a new resource assignment method and a selective resource assignment method are implemented, the resource assignment method used by the transmitter is notified to the receiver by means of a physical layer signal or an upper layer control signal. With this notification, the receiver can recognize the positions where the data symbols are mapped so as to perform the demodulation correctly using the conventional SFBC demodulation method.

Among the methods described in the first and second exemplary embodiments, only one method can be fixedly used or more than one method can be used selectively depending on the case. Also, it is possible to use more than two methods simultaneously. In some cases, one or more methods can be used fixedly. In this case, the transmitter can notify the receiver of the method applied by means of a physical layer control signal or an upper layer control signal. Accordingly, the receiver can perform a reception operation with the notified method.

Figure 14:
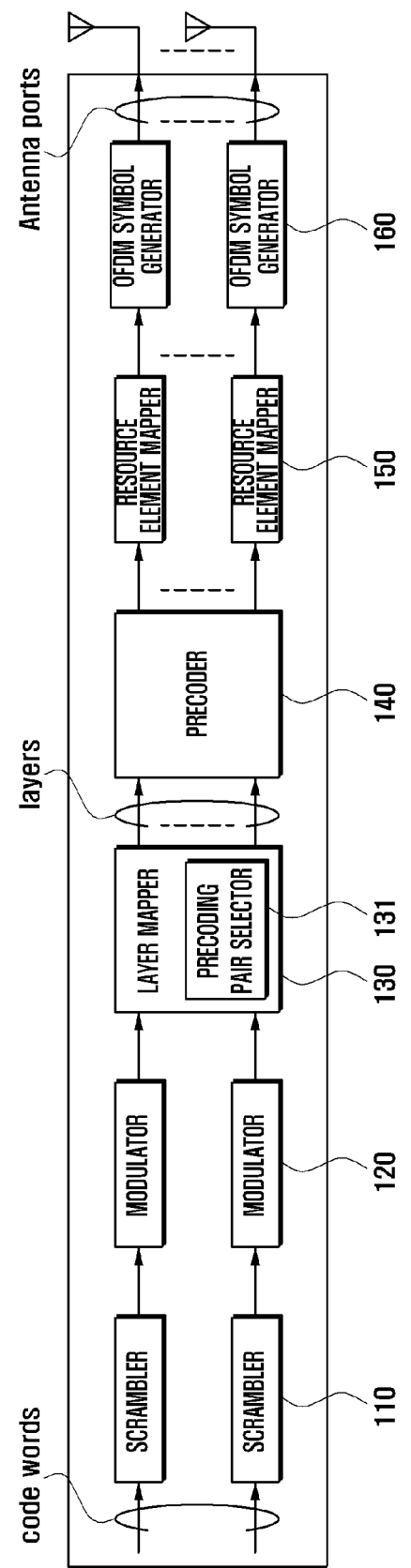
FIG. 14 is a block diagram illustrating a configuration of a transmitter according to an exemplary embodiment of the present invention.

FIG. 14 is a block diagram illustrating a configuration of a transmitter according to an exemplary embodiment of the present invention.

Referring to FIG. 14, the transmitter 100 includes a scrambler 110, a modulator 120, a layer mapper 130, a precoder 140, a resource element mapper 150, and an OFDM symbol generator 160.

In case of using multiple antennas, the transmission data are transmitted with one or more codewords. In case of using multiple codewords according to an exemplary embodiment of the present invention, when the data as codewords are input, the scrambler 110 performs scrambling on the input data.

The modulator 120 performs modulation on the scrambled data. The modulation can be performed with one of QPSK, 4QAM, and 16QAM.

The layer mapper 130 maps the modulation data input in series to the corresponding layers. More particularly, the layer mapper 130 includes a precoding pair selector 131.

The precoding pair selector 131 selects a pair of symbols to be precoded and outputs the paired symbols to the precoder 140. More particularly, the precoding pair selector 131 can output a pair of symbols that are transmitted on some subcarriers without being precoded according to the first exemplary embodiment of the present invention. This method has been described above with reference to parts (c) and (d) of FIG. 5, and part (b) of FIG. 6, FIG. 9, and FIG. 10.

The precoding pair selector 131 also can select and output a pair of symbols to be precoded in the adjacent OFDM symbols on some subcarriers according to the first exemplary embodiment of the present invention. This method has been described above with reference to part (e) of FIG. 5, part (c) of FIG. 6 and FIG. 11.

The precoder 140 performs precoding in units of a pair of symbols and outputs the precoded paired symbols in units of symbol in series.

The resource element mapper 150 is responsible for mapping the precoded symbols in the downlink frame per UE. That is, the resource element mapper 150 is responsible for mapping the precoded paired symbols to resource elements.

More particularly, the resource element mapper 150 can map the symbols such that the precoded symbols are not arranged on specific subcarriers according to the first exemplary embodiment of the present invention. This method has been described with reference to parts (a) and (b) of FIG. 5, and part (c) of FIG. 7 and FIG. 8.

The resource element mapper 150 can map the symbols such that the precoded paired symbols are arranged at different position in different OFDM symbols.

The OFDM symbol generator 160 performs modulation on the mapped (or arranged) precoded symbols into OFDM signals so as to be transmitted through antennas.

Figure 15:
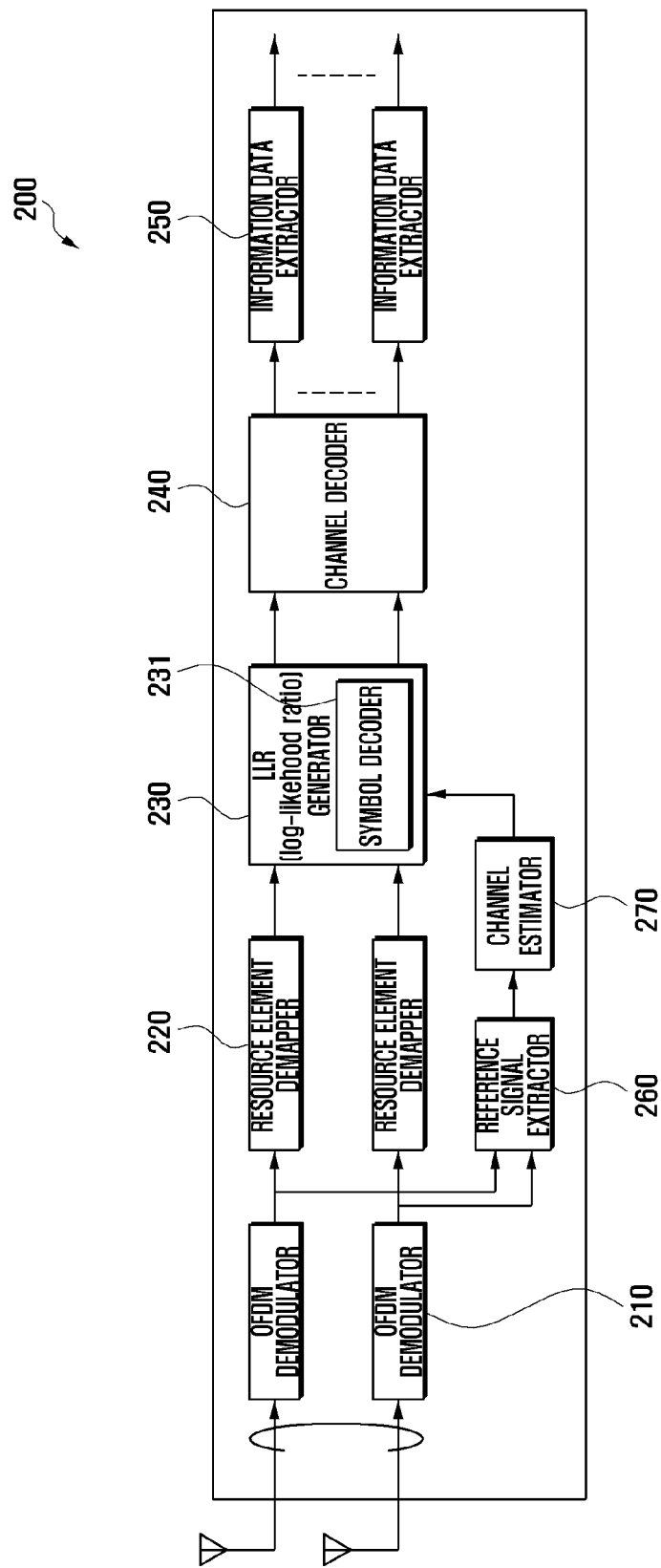
FIG. 15 is a block diagram illustrating a configuration of a receiver according to an exemplary embodiment of the present invention.

FIG. 15 is a block diagram illustrating a configuration of a receiver according to an exemplary embodiment of the present invention.

Referring to FIG. 15, the receiver 200 includes an OFDM demodulator 210, a resource element demapper 220, a Log-Likelihood Ratio (LLR) generator 230, a channel decoder 240, an information data extractor 250, a reference signal extractor 260, and a channel estimator 270.

As described above, the transmitter 100 notifies the receiver 200 of one or a combination of resource mapping methods that has been used for the resource arrangement. At this time, the transmitter 100 can notify the receiver 200 of the resource mapping method by means of a physical layer control signal or an upper layer control signal. It is assumed, in the following description, that the receiver 200 knows the resource mapping method used by the transmitter through this notification.

The OFDM demodulator 210 performs demodulation on the received OFDM signal and outputs the demodulated OFDM signal.

The reference signal extractor 260 extracts reference signals in units of OFDM symbols, and the channel estimator 270 estimates a channel based on the resource signals.

The resource element demapper 220 extracts the precoded symbols from the resource elements according to the resource mapping method transmitted by the transmitter 100.

More particularly when the transmitter 100 has not mapped any precoded paired symbols on specific subcarriers according to the first exemplary embodiment of the present invention, the resource element demapper 220 skips the extraction operation on the corresponding resource elements. This method has been described with reference to parts (a) and (b) of FIG. 5, and part (a) of FIG. 6, FIG. 7, and FIG. 8.

Also, when the transmitter 100 has mapped the precoded paired symbols to resource elements on different subcarriers in different OFDM symbols according to the second exemplary embodiment of the present invention, the resource element demapper 220 extracts the symbols from the corresponding resource elements as mapped by the transmitter. This method has been described with reference to FIGS. 12 and 13.

The LLR generator 230 computes the LLR value with the channel estimation value and outputs the computed LLR value. More particularly, the LLR generator 230 includes a symbol decoder 231. The symbol decoder 231 performs decoding on the precoded symbols according to the SFBC scheme. More particularly when the transmitter 100 has not mapped non-precoded symbols on some subcarriers according to the first exemplary embodiment of the present invention, the symbol decoder 231 determines the positions of the resource elements to which the non-precoded symbols are mapped and then skips decoding on the corresponding resource elements. As described above, the non-precoded symbol position acquisition method can be notified to the receiver 200 through an upper layer signaling. This method has been described with reference to parts (c) and (d), of FIG. 6, and part (b) of FIGS. 9 and 10.

Also, when the transmitter 100 has transmitted the paired symbols into two adjacent OFDM symbols according to the first exemplary embodiment of the present invention, the symbol decoder 231 determines the positions of the resource elements to which the precoded paired symbols in the two adjacent OFDM symbols and performs SFBC decoding on the corresponding resource elements along with the resource elements carrying the normally mapped symbols. As described above, the symbol position acquisition method can be notified to the receiver 200 through an upper layer signaling. This method has been described with reference to part (e) of FIG. 5, part (c) of FIG. 6, and FIG. 11.

If a pair of decoded symbols are input, the channel decoder 240 performs decoding on the data based on the LLR. The data decoding can be done by a turbo code decoding scheme.

The information data extractor 250 extracts original information data from the value decoded by the channel decoder 240. The information data can be extracted in units of codeword.

Hereinafter, a description is made under the assumption that the transmitter and receiver share the resource mapping method according to an exemplary embodiment of the present invention with reference to FIGS. 16 and 17. In the resource mapping method, the transmitter 100 notifies the receiver 200 of the applied resource mapping method through an upper layer signaling.

Figure 16:
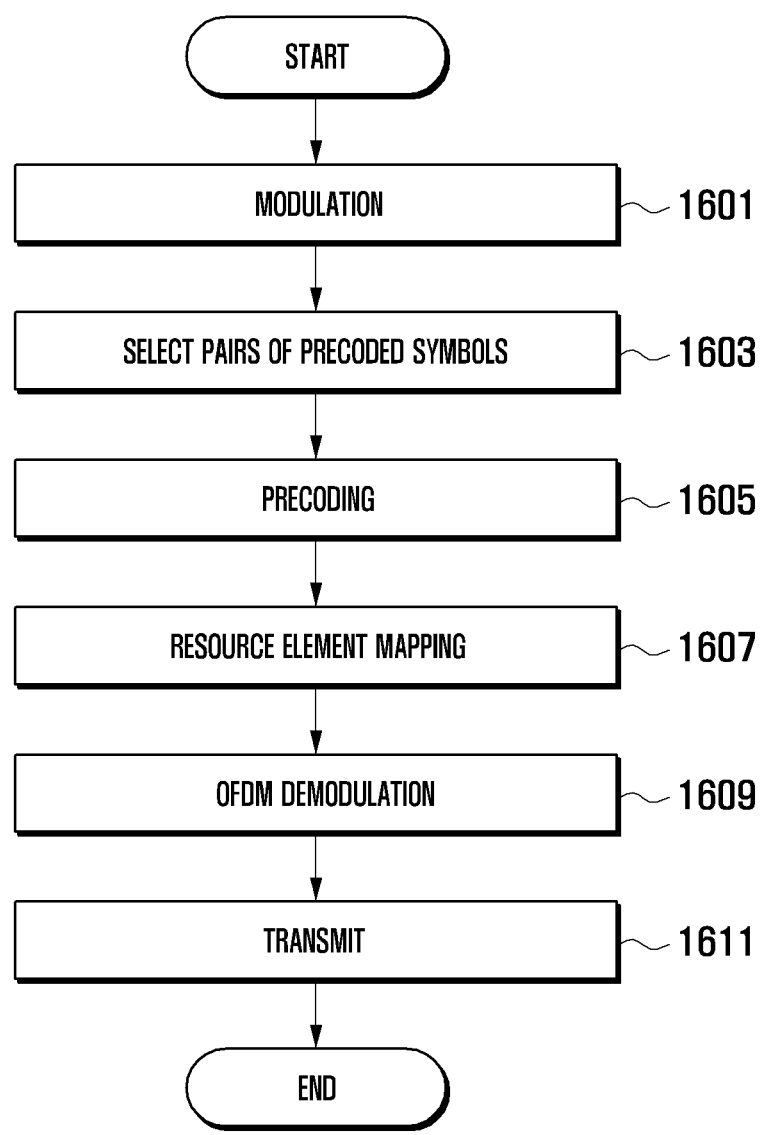
FIG. 16 is a flowchart illustrating a resource element mapping method of a transmitter according to an exemplary embodiment of the present invention.

FIG. 16 is a flowchart illustrating a resource element mapping method of a transmitter according to an exemplary embodiment of the present invention.

Referring to FIG. 16, the transmitter performs modulation on the data to be transmitted in step 1610. Here, the modulation is performed with one of a plurality of modulation schemes including QPSK, 4QAM, and 16QAM.

Next, the transmitter maps the modulated data to corresponding layers and selects a pair of symbols to be precoded in unit of symbol in step 1603. At this time, the transmitter can select a pair of symbols that are not precoded and transmitted on some subcarriers according to the first exemplary embodiment of the present invention. This method has been described with reference to parts (c) and (d) of FIG. 5, part (b) of FIG. 6, and FIGS. 9 and 10. The transmitter also can output a pair of symbols that can be precoded into the resource elements in two adjacent OFDM symbols on some subcarriers according to the first exemplary embodiment of the present invention. This method has been described with reference to part (e) of FIG. 5, part (c) of FIG. 6, and FIG. 11.

Next, the transmitter performs precoding on the selected symbols in step 1605.

Next, the transmitter maps the precoded paired symbols to the resource elements in step 1607. At this time, the transmitter may vacate the resource elements on specific subcarriers rather than mapping the precoded paired symbols according to the first exemplary embodiment of the present invention. This method has been described with reference to parts (a) and (b) of FIG. 5, part (a) of FIG. 6, and FIGS. 7 and 8. The transmitter also can map the precoded paired symbols to the resource elements on different subcarriers in different OFDM symbols according to the second exemplary embodiment of the present invention. This method has been described with reference to FIGS. 12 and 13.

Next, the transmitter performs OFDM modulation on the mapped symbols on the time axis in step 1609 and transmits the OFDM modulated signal in step 1611.

Figure 17:
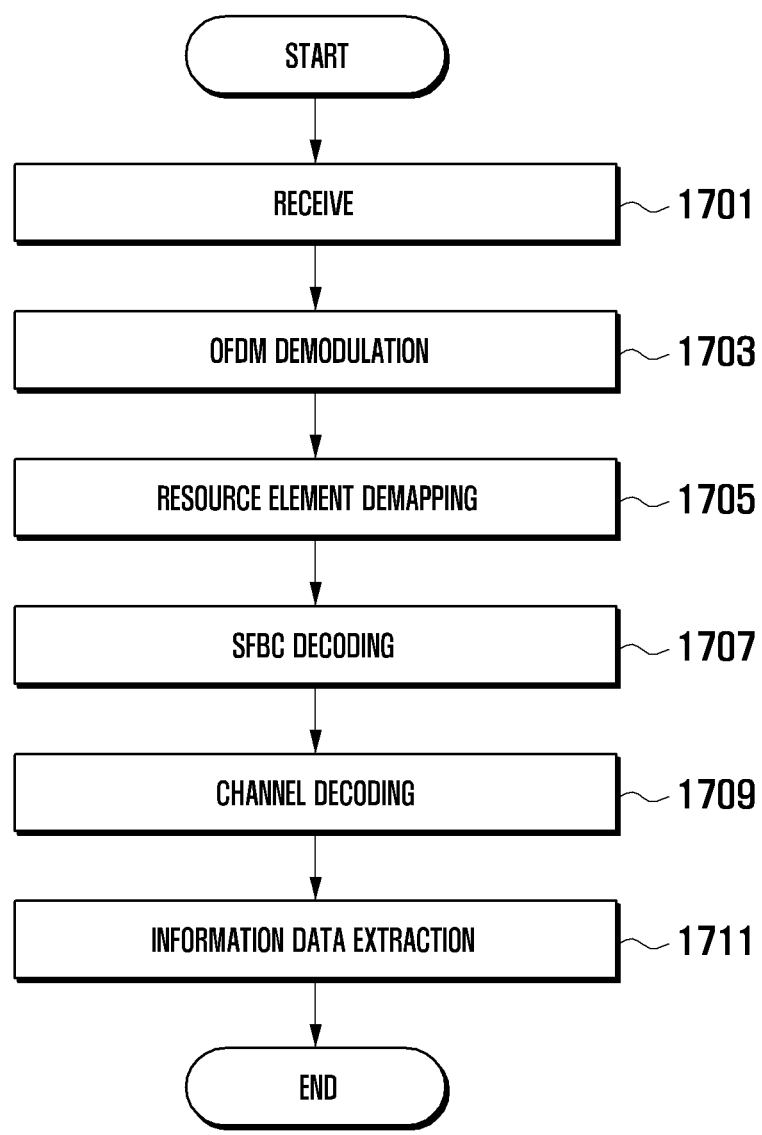
FIG. 17 is a flowchart illustrating a resource element demapping method of a receiver according to an exemplary embodiment of the present invention.

FIG. 17 is a flowchart illustrating a resource element demapping method of a receiver according to an exemplary embodiment of the present invention.

Referring to FIG. 17, the receiver receives signals in step 1701 and performs OFDM demodulation on the received signal in step 1703.

The receiver extracts reference signals from the demodulated signal and estimates a channel based on the extracted reference signals. The receiver also compensates for the value when demodulating the data on the estimated channel. Since the compensation method is out of the scope of the present invention, a detailed description is omitted herein.

Next, the receiver performs demapping on the OFDM demodulated signal at corresponding resource elements in step 1705. When the transmitter has not mapped the precoded symbols to the resource elements on specific subcarriers according to the first exemplary embodiment of the present invention, the receiver skips extracting symbols on the corresponding resource elements. This method has been described with reference to parts (a) and (b) of FIG. 5, part (a) of FIG. 6, and FIGS. 7 and 8. Also, when the transmitter has mapped the precoded paired symbols to the resource elements on different subcarriers in different OFDM symbols according to the second exemplary embodiment of the present invention, the receiver extracts these symbols at corresponding resource elements as mapped by the transmitter. This method has been described with reference to FIGS. 12 and 13.

Next, the receiver performs SFBC decoding in step 1707. At this time, when the transmitter has mapped the non-precoded symbols to the resource elements on some subcarriers according to the first exemplary embodiment of the present invention, the receiver determines the positions of the resource elements to which the non-precoded symbols are mapped and skips decoding at the corresponding resource elements. As described above, the transmitter can notify the receiver of the non-precoded symbols position acquisition method through an upper layer signaling. This method has been described with reference to parts (c) and (d) of FIG. 5, part (b) of FIG. 6, and FIGS. 9 and 10. Also, when the transmitter has mapped the precoded symbols to the resource elements on different subcarriers in two adjacent OFDM symbols, the receiver determines the positions of the resource elements to which the precoded symbols are mapped in the adjacent OFDM symbols and performs SFBC decoding on the corresponding paired symbols. As aforementioned, the transmitter can notify the receiver of the precoded symbol position acquisition method through an upper layer signaling. This method has been described with reference to part (b) of FIG. 5, part (c) of FIG. 6, and FIG. 11.

Next, the receiver performs channel decoding in step 1709. The receiver calculates the LLR value from the symbol data and performs channel decoding based on the calculated LLR value. Next, the receiver extracts the original information data from the channel-decoded values in step 1711.

A description is made of an exemplary method for mapping the channel state information reference signal hereinafter with reference to FIGS. 18 to 32.

Figure 18:
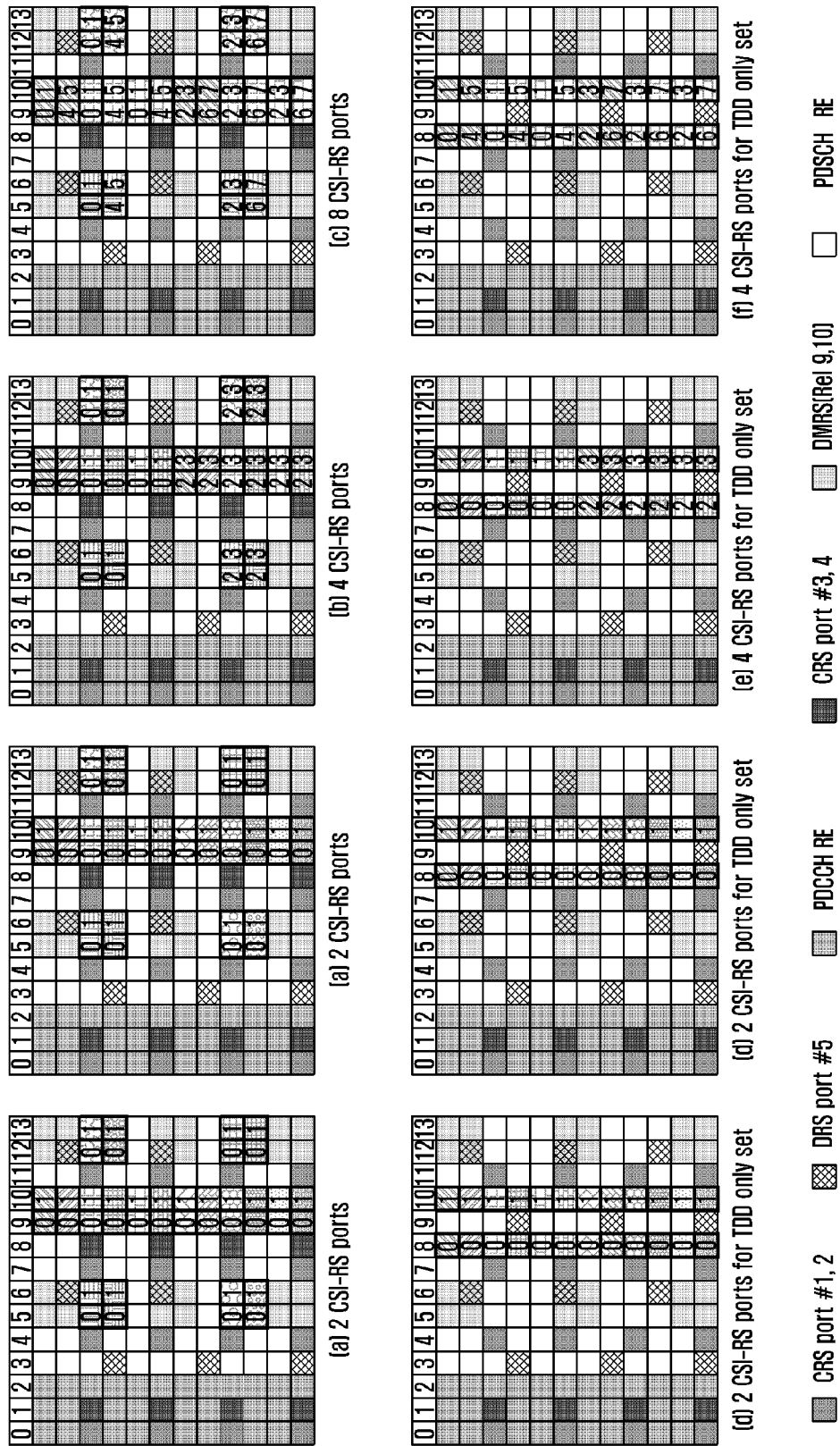
FIG. 18 is a diagram illustrating arrangements of channel state information reference signals in resource blocks used in an LTE system according to an exemplary embodiment of the present invention.

FIG. 18 is a diagram illustrating arrangements of channel state information reference signals in resource blocks used in an LTE system according to an exemplary embodiment of the present invention.

Referring to FIG. 18, the Channel State Information Reference Signal (CSI-RS) is the reference signal transmitted for the UE to measure the channel state. The CSI-RS is transmitted from the eNB to the UEs. Unlike the Common Reference Signal (CRS) of an LTE system which is transmitted in every subframe, the CSI-RS is transmitted at a regular interval. The CSI-RSs are mapped in resource blocks as shown in FIG. 18.

In an LTE system, the precoded symbols are mapped to the resource elements according to the following procedure. The LTE system uses the SFBC for achieving transmission diversity, such that the number of precoded symbols to be mapped to the resource elements must be multiple of 2. Under the basic assumption for applying the SFBC, the precoded paired symbols must experience the same or similar channel environment. It is preferred that the precoded paired symbols are mapped to resource elements positioned closely to each other. The CRSs of the LTE system of FIG. 1 shows a representative example of the reference signal arrangement.

Figure 19:
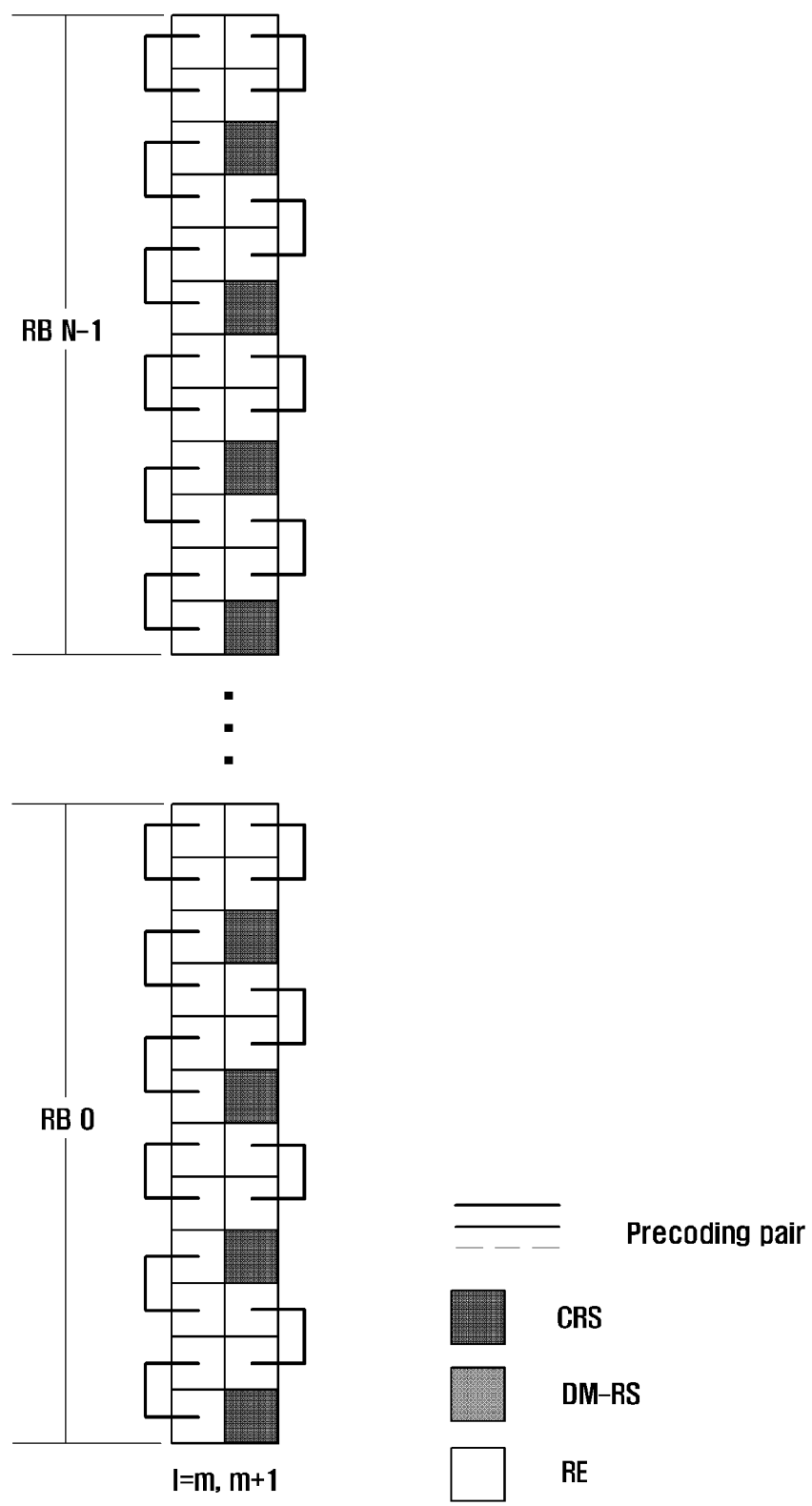
FIG. 19 is a diagram illustrating a principle of precoded paired symbol mapping in an LTE system according to an exemplary embodiment of the present invention.

FIG. 19 is a diagram illustrating a principle of the precoded paired symbol mapping in an LTE system according to an exemplary embodiment of the present invention.

Referring to FIG. 19, a case is illustrated in which the precoded paired symbols are arranged in an OFDM symbol having the CRSs of four antenna ports. Each pair of precoded symbols is connected through a solid line. Accordingly, it can be observed that a pair of symbols that are SFBC-precoded are mapped to resource elements on the adjacent subcarriers.

Although the CRS of LTE is partially used, the LTE-A system adopts the CSI-RS as shown in FIG. 18 for measuring channel state. With the introduction of the CSI-RS, it is likely to degrade the system performance to apply the transmission diversity and resource mapping scheme used in the LTE system to the LTE-A system without modification.

In other words, the number of resource elements to which the precoded symbols can be mapped in an OFDM symbol carrying the CSI-RS can be an odd number or not be a multiple of 4 as shown in FIG. 18. In this case, the SFBC-precoded paired symbols can be mapped to the REs that are spaced far apart from each other when using the conventional resource assignment rule so as to experience different channel environments, resulting in performance degradation.

In the LTE-A system, the CRSs for 1, 2, and 4 antenna ports and the CSI-RSs for 1, 2, 4, and 8 antenna ports can be freely arranged. Accordingly, when the CRSs of two antenna ports are transmitted, the CRSs can be arranged along with the CSI-RSs of one or two antenna ports.

FIG. 20 is a diagram illustrating exemplary arrangements of precoded paired symbols when the number of CRS antenna ports is 2 and the number of CSI-RS antenna ports is 1 in the LTE-A system according to an exemplary embodiment of the present invention. That is, FIG. 20 shows the arrangements of the CRSs of two antenna ports and the CSI-RSs of one antenna port.

Referring to FIG. 20, the symbols positioned at the top and bottom of the RBs, colored distinctly, and linked by a solid line are the paired symbols causing the performance degradation. The performance-degrading paired symbols can be determined depending when the number of assigned RBs is odd number or even number as shown in parts (a) and (b) of FIG. 20.

Figure 21:
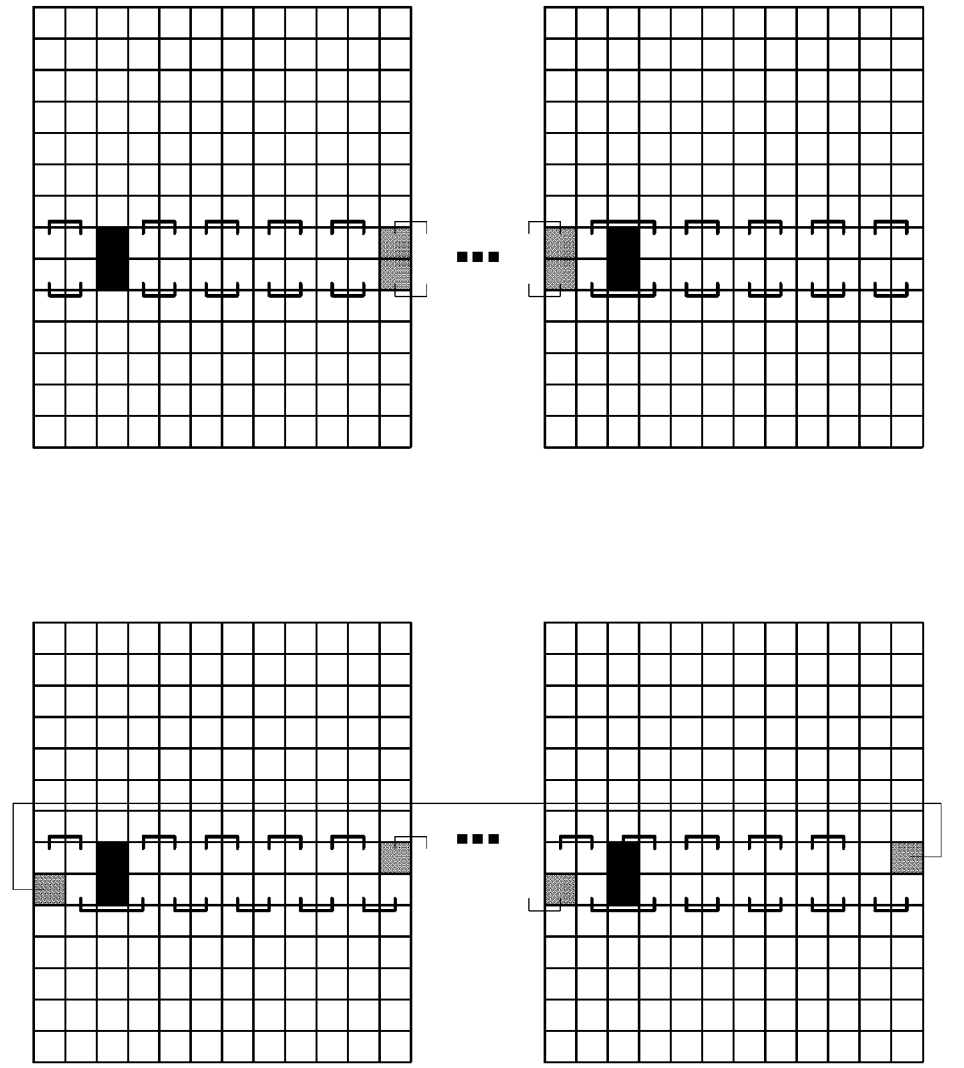
FIG. 21 is a diagram illustrating exemplary arrangements of precoded paired symbols when the number of CRS antenna ports is 2 and the number of CSI-RS antenna ports is 2 in an LTE-A system according to an exemplary embodiment of the present invention.
Figure 23:
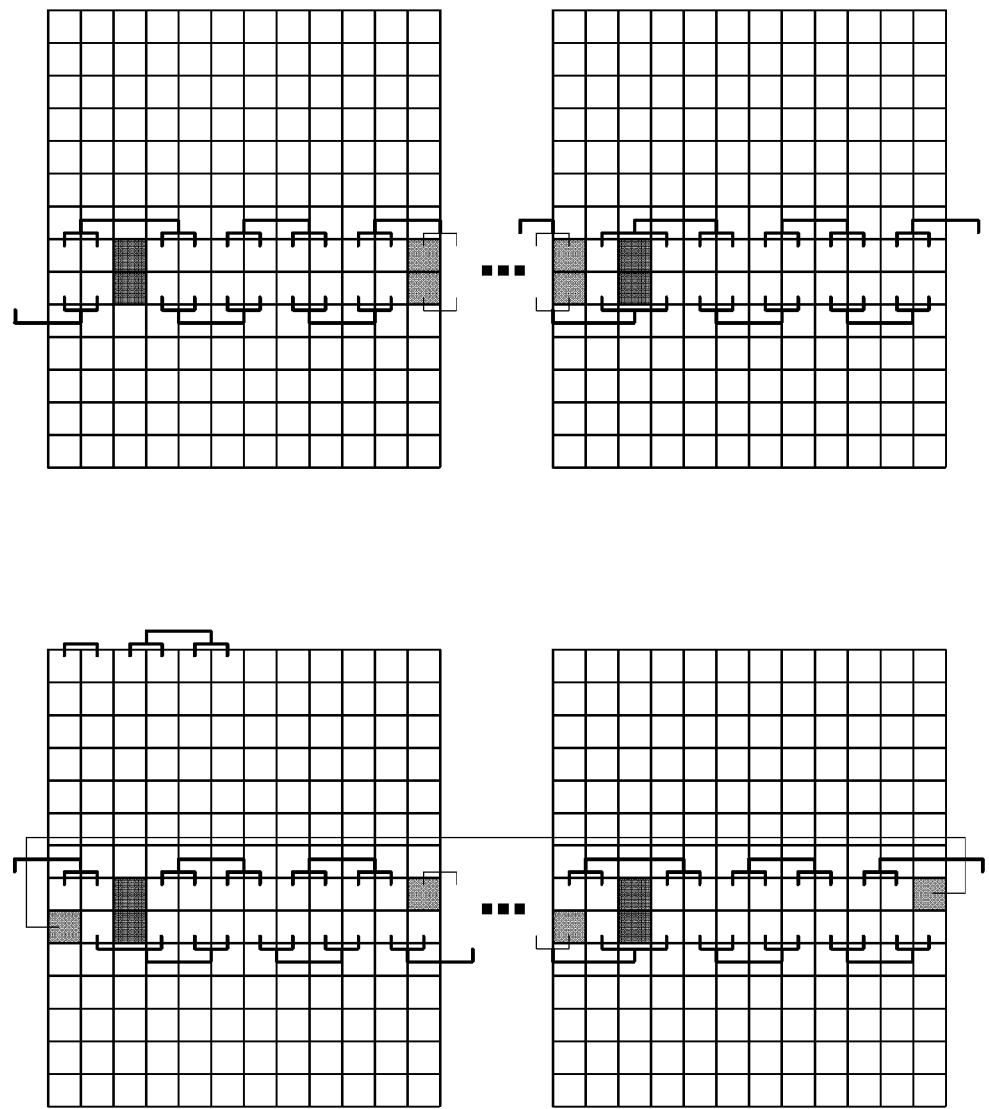
FIG. 23 is a diagram illustrating exemplary arrangements of precoded paired symbols when the number of CRS antenna ports is 4 and the number of CSI-RS antenna ports is 2 in an LTE-A system according to an exemplary embodiment of the present invention.

FIG. 21 is a diagram illustrating exemplary arrangements of the precoded paired symbols when the number of CRS antenna ports is 2 and the number of CSI-RS antenna ports is 2 in the LTE-A system according to an exemplary embodiment of the present invention. FIG. 22 is a diagram illustrating exemplary arrangements of the precoded paired symbols when the number of CRS antenna ports is 4 and the number of CSI-RS antenna ports is 1 in the LTE-A system according to an exemplary embodiment of the present invention. FIG. 23 is a diagram illustrating exemplary arrangements of the precoded paired symbols when the number of CRS antenna ports is 4 and the number of CSI-RS antenna ports is 2 in the LTE-A system according to an exemplary embodiment of the present invention. In FIGS. 21 to 23, the symbols linked by solid lines and illustrated with different shading are the performance-degrading paired symbols.

The performance degradation of the transmission diversity in the LTE-A system is caused by SFBC-precoded paired symbols that are not mapped to adjacent REs. Resource mapping methods that are capable of overcoming the transmission diversity performance degradation problem in the LTE-A system are proposed in the third and fourth exemplary embodiments of the present invention.

Third Exemplary Embodiment

In order to overcome the transmission diversity performance degradation problem, an exemplary method for mapping the precoded symbols to specific resource elements is proposed. An exemplary precoded symbol mapping method is described with reference to FIGS. 24 to 27.

Figure 26:
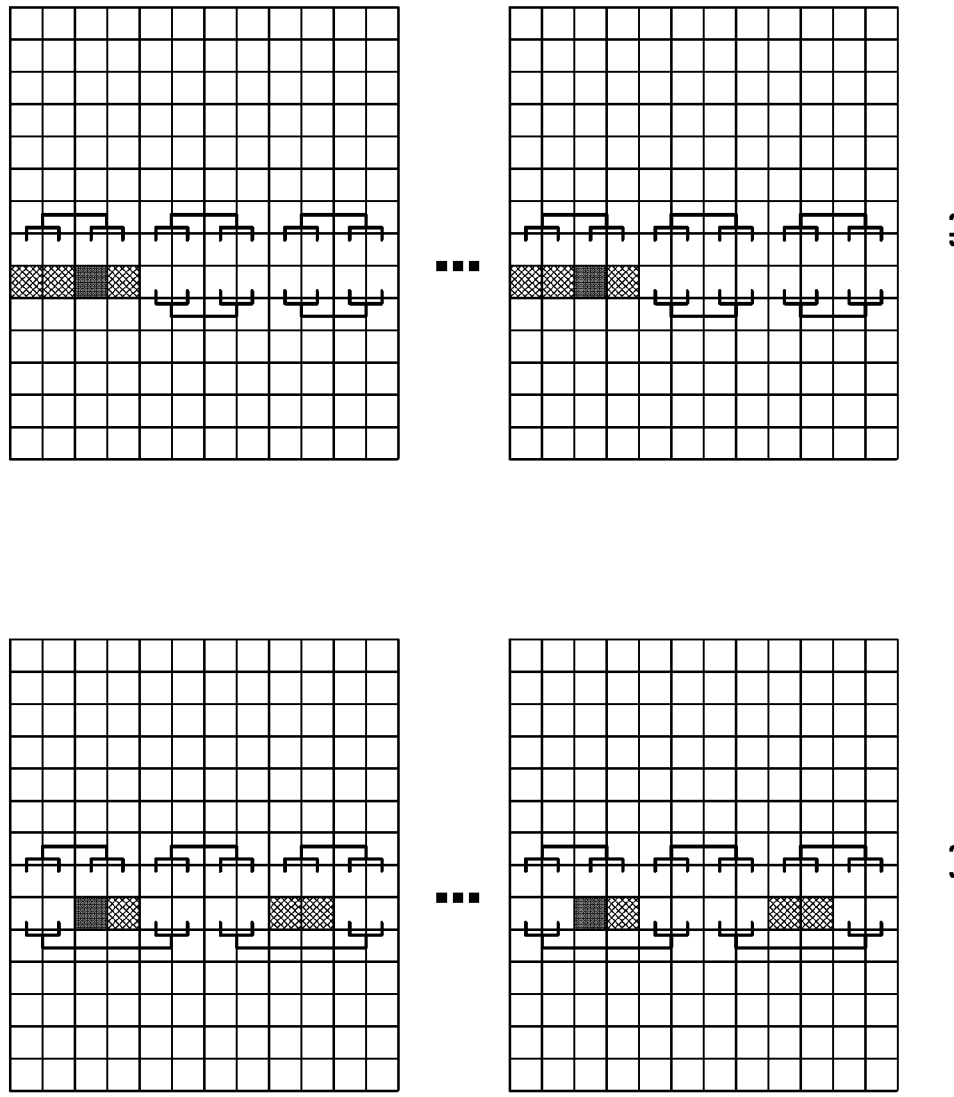
FIG. 26 is a diagram illustrating arrangements of precoded paired symbols when the number of CRS antenna ports is 4 and the number of CSI-RS antenna ports is 1 in an LTE-A system according to an exemplary embodiment of the present invention.
Figure 27:
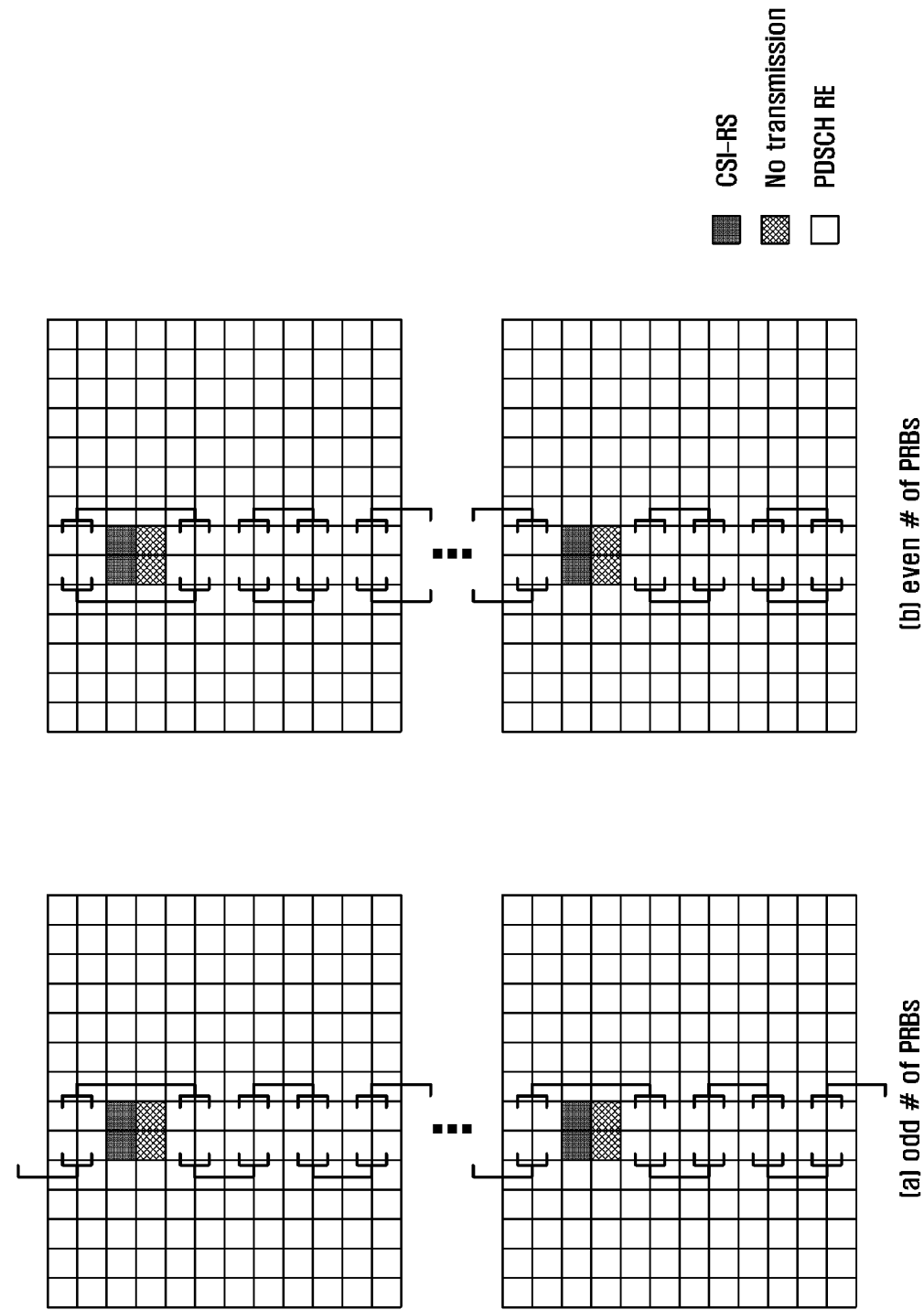
FIG. 27 is a diagram illustrating arrangements of precoded paired symbols when the number of CRS antenna ports is 4 and the number of CSI-RS antenna ports is 2 in an LTE-A system according to an exemplary embodiment of the present invention.

FIG. 24 is a diagram illustrating an arrangement of the precoded paired symbols when the number of CRS antenna ports is 2 and the number of CSI-RS antenna ports is 1 in the LTE-A system according to an exemplary embodiment of the present invention. FIG. 25 is a diagram illustrating arrangements of the precoded paired symbols when the number of CRS antenna ports is 2 and the number of CSI-RS antenna ports is 2 in the LTE-A system according to an exemplary embodiment of the present invention. FIG. 26 is a diagram illustrating arrangements of the precoded paired symbols when the number of CRS antenna ports is 4 and the number of CSI-RS antenna ports is 1 in the LTE-A system according to an exemplary embodiment of the present invention. FIG. 27 is a diagram illustrating arrangements of the precoded paired symbols when the number of CRS antenna ports is 4 and the number of CSI-RS antenna ports is 2 in the LTE-A system according to an exemplary embodiment of the present invention.

The following description illustrates a situation having a CRS of two antenna ports and a CSI-RS of one antenna port.

Referring to FIG. 24, the RB is configured such that the number of REs to be used for PDCCH transmission in an OFDM symbol becomes an even number to avoid that the SFBC-precoded paired symbols are mapped to the REs spaced far apart from each other. In this case, the SFBC can be used for transmission diversity, and one of the REs adjacent to the CSI-RS in the OFDM symbol having the CSI-RS is maintained in an empty state as shown in FIG. 24. To maintain an RE in an empty state means that nothing is mapped to the corresponding RE. The RE to be transmitted in an empty state is determined according to the following rule: The REs belonging to an OFDM symbol in an RB are indexed in ascending order with which the resource is assigned in the LTE system. That is, the first RE of the OFDM symbol in the RB is assigned the index 0 and the last RE is assigned the index 11.

In case that the index n of the RE to which a CSI-RS is mapped is an odd number (mod(n, 2)=1), the RE having an index n−1 in the OFDM carrying the CSI-RS is transmitted in an empty state. In case that the index n of the RE to which a CSI-RS is mapped is an even number (mod(n, 2)=0), the RE having an index n+1 in the OFDM carrying the CSI-RS is transmitted in an empty state.

The following description illustrates a situation having a CRS of two antenna ports and a CSI-RS of two antenna ports.

Referring to FIG. 25, the SFBC can be applied for transmission diversity in which case the REs adjacent to the REs to which one CSI-RS is mapped are transmitted in an empty state in the OFDM symbols carrying the CSI-RS. As illustrated, when the CSI-RSs of the two antenna ports are transmitted, the CSI-RSs are mapped to the REs on the same subcarrier in two contiguous OFDM symbols. Here, the REs to be transmitted in an empty state are the ones positioned adjacent to the REs to which the CSI-RSs are mapped in the OFDM symbols carrying the CSI-RSs. The REs to be transmitted in an empty state are determined according to the following rule: In case that the index n of the RE to which a CSI-RS is mapped is an odd number (mod(n, 2)=1), the RE having an index n−1 in the OFDM symbol carrying the CSI-RS is transmitted in an empty state. In case that the index n of the RE to which a CSI-RS is mapped in an even number (mod(n, 2)=0), the RE having an index n+1 in the OFDM carrying the CSI-RS is transmitted in an empty state.

The following description illustrates a situation having a CRS of four antenna ports and CSI-RS of one antenna port.

Referring to FIG. 26, the FSTD can be applied for transmission diversity in which case three REs can be transmitted in an empty state in an OFDM symbol carrying the CSI-RS. The CSI-RSs, as shown in FIG. 18, are mapped to the four or twelve REs in one OFDM symbol within an RB. In case that the CSI-RSs can be mapped to four REs, the three REs, excluding the RE mapped to the CSI-RS, can be transmitted in an empty state as shown in part (a) of FIG. 26. In the case that CSI-RSs can be mapped to twelve REs, the three REs adjacent to the REs to which the current CSI-RSs are mapped can be transmitted in an empty state as shown in part (b) of FIG. 26. Here, the REs to be transmitted in an empty state are determined according to the following rule:

If $\lfloor n \div 4 \rfloor = 0$ is applied to the index n of the RE to which a CSI-RS is mapped, the three REs fulfilling $\lfloor n \div 4 \rfloor = 0$, excluding the RE to which the current CSI-RS is mapped, in the OFDM symbol carrying the CSI-RS are transmitted in an empty state. If $\lfloor n \div 4 \rfloor = 1$ is applied to the index n of the RE to which a CSI-RS is mapped, the three REs fulfilling $\lfloor n \div 4 \rfloor = 1$, excluding the RE to which the current CSI-RS is mapped, in the OFDM symbol carrying the CSI-RS are transmitted in an empty state. If $\lfloor n \div 4 \rfloor = 2$ is applied to the index n of the RE to which a CSI-RS is mapped, the three REs fulfilling $\lfloor n \div 4 \rfloor = 2$, excluding the RE to which the current CSI-RS is mapped, in the OFDM symbol carrying the CSI-RS are transmitted in an empty state. Finally, if $\lfloor n \div 4 \rfloor = 3$ is applied to the index n of the RE to which a CSI-RS is mapped, the three REs fulfilling $\lfloor n \div 4 \rfloor = 3$, excluding the RE to which the current CSI-RS is mapped, in the OFDM symbol carrying the CSI-RS are transmitted in an empty state.

The following description illustrates a situation having a CRS of four antenna ports and a CSI-RS of two antenna ports.

Referring to FIG. 27, the FSTD can be applied for transmission diversity in which case the REs adjacent to the RE to which the CSI-RS are mapped in the OFDM symbol carrying the CSI-RS can be transmitted in an empty state. In case that there are the CSI-RSs of two antenna ports, the CSI-RSs are mapped to the REs on the same subcarrier in the two adjacent OFDM symbols as shown in FIG. 27. Accordingly, the RE adjacent to the RE which is mapped to the CSI-RS in each OFDM symbol carrying the CSI-RS is transmitted in an empty state. The REs to be transmitted in an empty state are determined according to the following rule: In case that the index n of the RE to which a CSI-RS is mapped is an odd number (mod(n, 2)=1), the RE having an index n−1 in the OFDM symbol carrying the CSI-RS is transmitted in an empty state. In case that the index n of the RE to which a CSI-RS is mapped is an even number (mod(n, 2)=0), the RE having an index n+1 in the OFDM carrying the CSI-RS is transmitted in an empty state.

One or more of the aforementioned exemplary methods for transmitting the REs on some subcarriers in an empty state can be supported in the LTE-A system. In case that more than one method is supported, the eNB can notify the UE of the applied method through a physical layer signaling or an upper layer signaling. Accordingly, the UE has the knowledge about positions on the subcarriers where no signal is transmitted or control signals are transmitted.

The signals (e.g., control signals) other than precoded symbols are mapped to the REs, the UE performs modulation on the corresponding positions in appropriate method. At this time, the UE demodulates the positions at which the data symbols are precoded separately. The UE set the value of the REs that have been transmitted in an empty state to null (0) and performs demodulation on the precoded symbols and other signals. Also, the UE can perform demodulation on the precoded symbols on the resource excluding specific positions.

Fourth Exemplary Embodiment

In an LTE-A system, a new resource mapping method is need in order to address the aforementioned problem occurring in the conventional resource mapping method used in the LTE system in which the modulation symbols are mapped to corresponding layers and then sequentially SFBC-precoded in pairs. Exemplary embodiments of the present invention propose the following methods to address the aforementioned problems.

An exemplary method is to map non-SFBC precoded symbols to some REs.

In SFBC, if a pair of precoded symbols experience largely different channel environments, this is likely to cause demodulation error. The demodulation error causes performance degradation in a turbo code decoding process. In order to avoid the demodulation error, exemplary embodiments of the present invention propose a resource mapping method in which non-SFBC precoded data symbols are mapped to specific REs.

In this resource mapping method, a pair of symbols that are not precoded in SFBC are mapped to the REs located at specific positions. The RE to which the non-precoded symbol is mapped can be determined by a few exemplary methods. These methods are described with reference to FIGS. 28 to 31.

Figure 30:
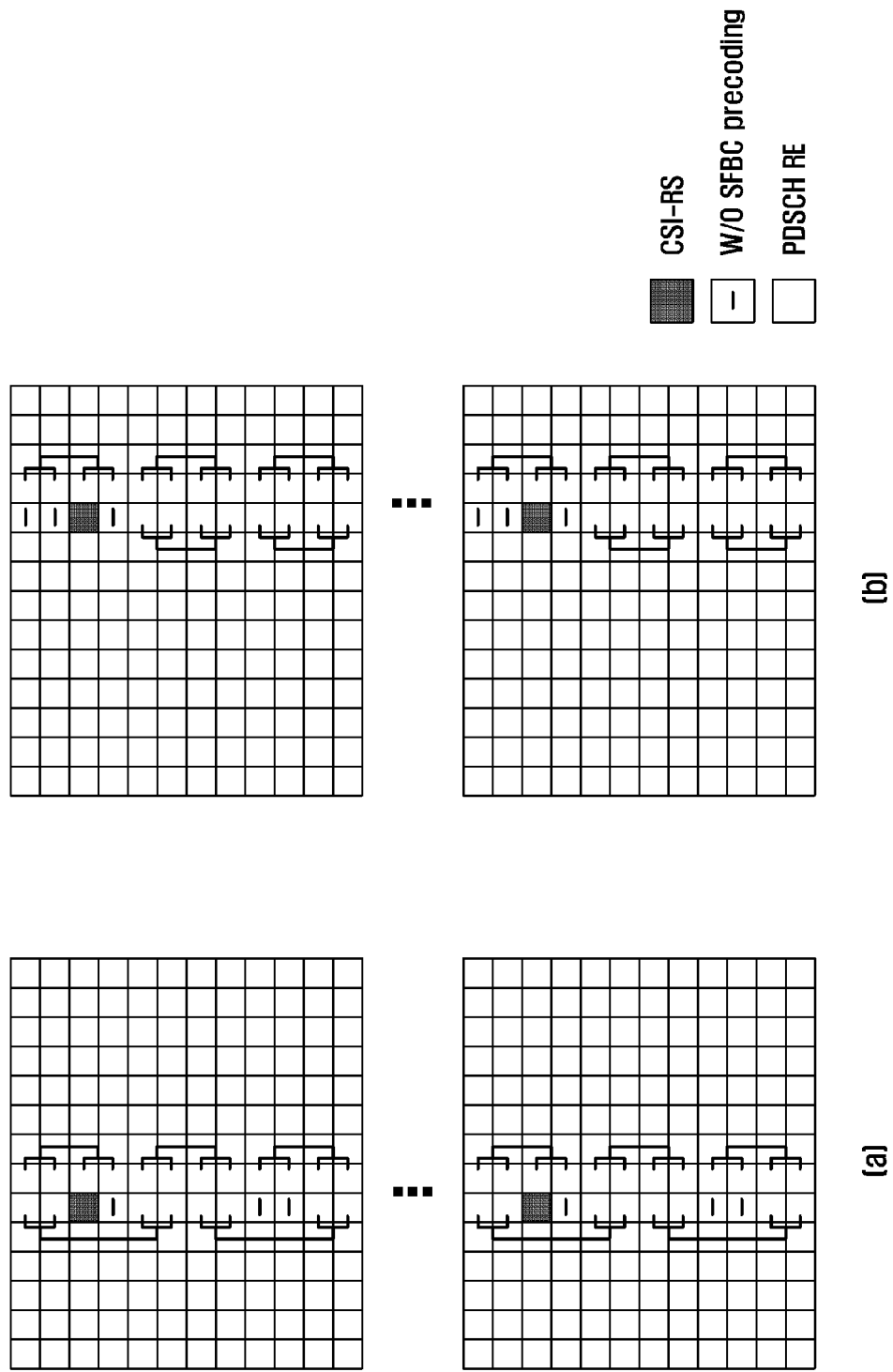
FIG. 30 is a diagram illustrating an arrangement of non-precoded symbols when the number of CRS antenna ports is 4 and the number of CSI-RS antenna ports is 1 in an LTE-A system according to an exemplary embodiment of the present invention.
Figure 31:
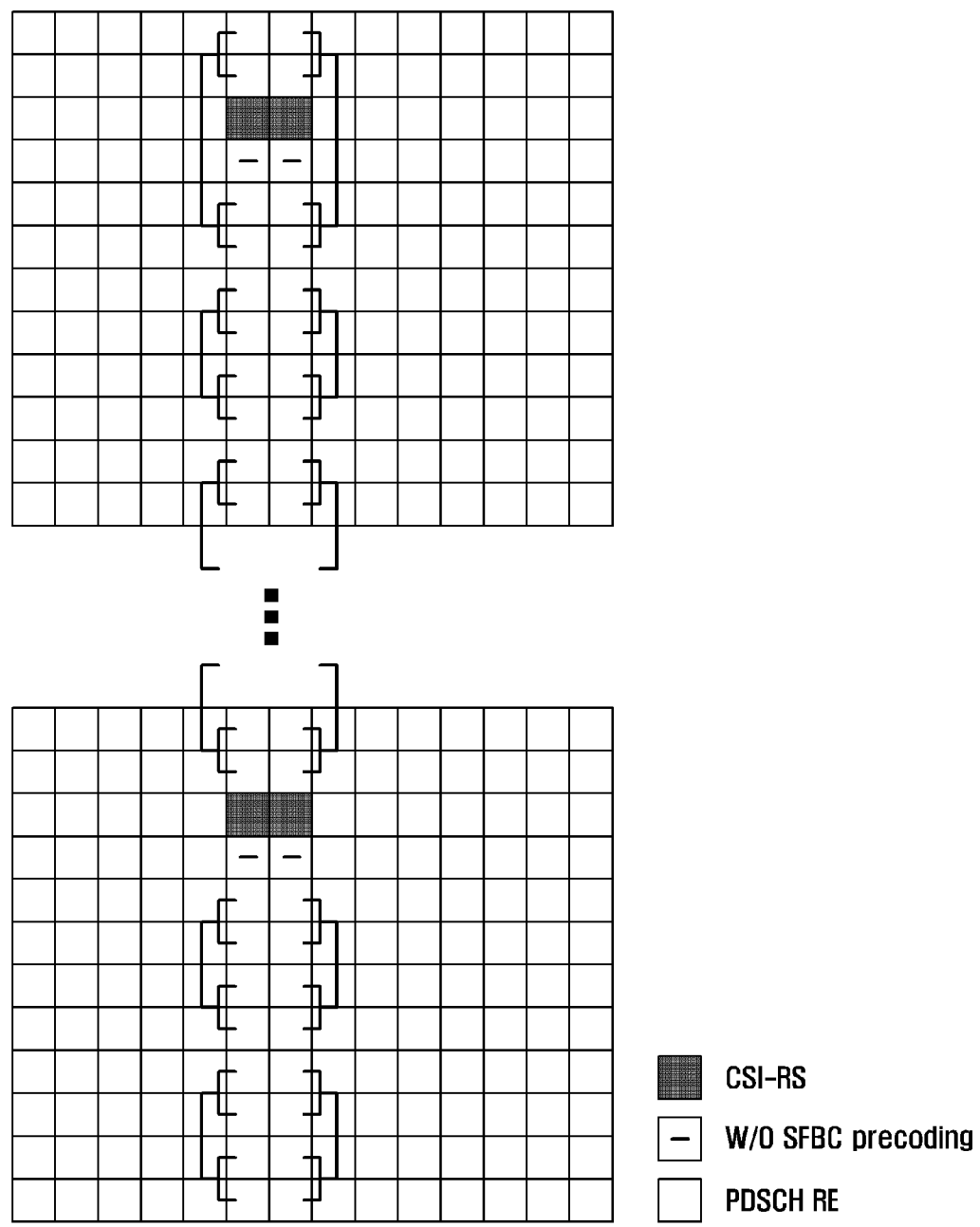
FIG. 31 is a diagram illustrating an arrangement of non-precoded symbols when the number of CRS antenna ports is 4 and the number of CSI-RS antenna ports is 2 in an LTE-A system according to an exemplary embodiment of the present invention.

FIG. 28 is a diagram illustrating an arrangement of non-precoded symbols when the number of CRS antenna ports is 2 and the number of CSI-RS antenna ports is 1 in an LTE-A system according to an exemplary embodiment of the present invention. FIG. 29 is a diagram illustrating an arrangement of non-precoded symbols when the number of CRS antenna ports is 2 and the number of CSI-RS antenna ports is 2 in an LTE-A system according to an exemplary embodiment of the present invention. FIG. 30 is a diagram illustrating an arrangement of the non-precoded symbols when the number of CRS antenna ports is 4 and the number of CSI-RS antenna ports is 1 in an LTE-A system according to an exemplary embodiment of the present invention. FIG. 31 is a diagram illustrating an arrangement of non-precoded symbols when the number of CRS antenna ports is 4 and the number of CSI-RS antenna ports is 2 in an LTE-A system according to an exemplary embodiment of the present invention.

The following description illustrates a situation having a CRS of two antenna ports and a CSI-RS of one antenna port.

Referring to FIG. 28, SFBC can be applied for transmission diversity, but the SFBC is not applied to one of the REs adjacent to the RE to which the CSI-RS is mapped in the OFDM symbol carrying the CSI-RS according to an exemplary embodiment of the present invention.

The REs are indexed in an RB as follows: the REs belonging to an OFDM symbol in an RB is indexed in ascending order with which the resource is assigned. In this case, the first RE of the OFDM symbol in the RB is assigned the index 0 and the last RE is assigned the index 11.

In case that the index n of the RE to which a CSI-RS is mapped is an odd number (mod(n, 2)=1), the RE having an index n−1 in the OFDM carrying the CSI-RS is transmitted with non-SFBC-precoded symbol. In case that the index n of the RE to which a CSI-RS is mapped in an even number (mod(n, 2)=0), the RE having an index n+1 in the OFDM carrying the CSI-RS is transmitted with non-SFBC-precoded symbol.

The following description illustrates a situation having a CRS of two antenna ports and a CSI-RS of two antenna ports.

Referring to FIG. 29, the SFBC can be applied for transmission diversity in which case the REs adjacent to the REs to which one CSI-RS is mapped are transmitted with non-SFBC-precoded symbol in the OFDM symbols carrying the CSI-RS. As illustrated, when the CSI-RSs of the two antenna ports are transmitted, the CSI-RSs are mapped to the REs on the same subcarrier in two contiguous OFDM symbols. Here, the REs to be transmitted with non-SFBC-precoded symbol are the ones positioned adjacent to the REs to which the CSI-RSs are mapped in the OFDM symbols carrying the CSI-RSs.

In case that the index n of the RE to which a CSI-RS is mapped is an odd number (mod(n, 2)=1), the RE having an index n−1 in the OFDM symbol carrying the CSI-RS is transmitted with non-SFBC-precoded symbol. In case that the index n of the RE to which a CSI-RS is mapped is an even number (mod(n, 2)=0), the RE having an index n+1 in the OFDM carrying the CSI-RS is transmitted with non-SFBC -precoded symbol.

The following description illustrates a situation having a CRS of four antenna ports and a CSI-RS of one antenna port.

Referring to FIG. 20, the FSTD can be applied for transmission diversity in which case three REs can be transmitted in an empty state in an OFDM symbol carrying the CSI-RS. The CSI-RSs, as shown in FIG. 18, are mapped to the four or twelve REs in one OFDM symbol within an RB. In case that the CSI-RSs can be mapped to four REs, the three REs, excluding the RE mapped to the CSI-RS, can be transmitted with non-SFBC-precoded symbol as shown in part (a) of FIG. 30. In case that CSI-RSs can be mapped to twelve REs, the three REs adjacent to the REs to which the current CSI-RSs are mapped can be transmitted with non-SFBC-precoded symbol as shown in part (b) of FIG. 30. Here, the REs to be transmitted with non-SFBC-precoded symbol are determined according to the following rule: If $\lfloor n \div 4 \rfloor = 0$ is applied to the index n of the RE to which a CSI-RS is mapped, the three REs fulfilling $\lfloor n \div 4 \rfloor = 0$, excluding the RE to which the current CSI-RS is mapped, in the OFDM symbol carrying the CSI-RS are transmitted with non-SFBC-precoded symbol. If $\lfloor n \div 4 \rfloor = 1$ is applied to the index n of the RE to which a CSI-RS is mapped, the three REs fulfilling $\lfloor n \div 4 \rfloor = 1$, excluding the RE to which the current CSI-RS is mapped, in the OFDM symbol carrying the CSI-RS are transmitted with non-SFBC-precoded symbol. If $\lfloor n \div 4 \rfloor = 2$ is applied to the index n of the RE to which a CSI-RS is mapped, the three REs fulfilling $\lfloor n \div 4 \rfloor = 2$, excluding the RE to which the current CSI-RS is mapped, in the OFDM symbol carrying the CSI-RS are transmitted with non-SFBC-precoded symbol. Finally, if $\lfloor n \div 4 \rfloor = 3$ is applied to the index n of the RE to which a CSI-RS is mapped, the three REs fulfilling $\lfloor n \div 4 \rfloor = 3$, excluding the RE to which the current CSI-RS is mapped, in the OFDM symbol carrying the CSI-RS are transmitted with non-SFBC-precoded symbol.

The following description illustrates a situation having a CRS of four antenna ports and a CSI-RS of two antenna ports.

Referring to FIG. 31, the FSTD can be applied for transmission diversity in which case the REs adjacent to the RE to which the CSI-RS are mapped in the OFDM symbol carrying the CSI-RS can be transmitted with non-SFBC-precoded symbol. In case that there are the CSI-RSs of two antenna ports, the CSI-RSs are mapped to the REs on the same subcarrier in the two adjacent OFDM symbols as shown in FIG. 31. Accordingly, the RE adjacent to the RE which is mapped to the CSI-RS in each OFDM symbol carrying the CSI-RS is transmitted with non-SFBC-precoded symbol, and the REs to be transmitted with non-SFBC-precoded symbol are determined according to the following rule: In case that the index n of the RE to which a CSI-RS is mapped is an odd number (mod(n, 2)=1), the RE having an index n−1 in the OFDM symbol carrying the CSI-RS is transmitted with non-SFBC-precoded symbol. In case that the index n of the RE to which a CSI-RS is mapped is an even number (mod(n, 2)=0), the RE having an index n+1 in the OFDM carrying the CSI-RS is transmitted with non-SFBC-precoded symbol.

One or more of the aforementioned exemplary methods for transmitting the REs on some subcarriers with a non-SFBC-precoded symbol can be supported in the LTE-A system. In case that more than one method is supported, the eNB can notify the UE of the applied method through a physical layer signaling or an upper layer signaling. Accordingly, the UE has the knowledge about positions on the subcarriers where the non-SFBC-precoded symbol or control signals are transmitted. Based on this knowledge, the UE demodulates the symbols mapped to the corresponding REs without SFBC decoding. The UE also performs SFBC decoding on the precoded symbols mapped to the remaining REs, excluding the symbols mapped to the corresponding REs.

The second exemplary method is to perform precoding across adjacent symbols on some subcarriers.

Figure 32:
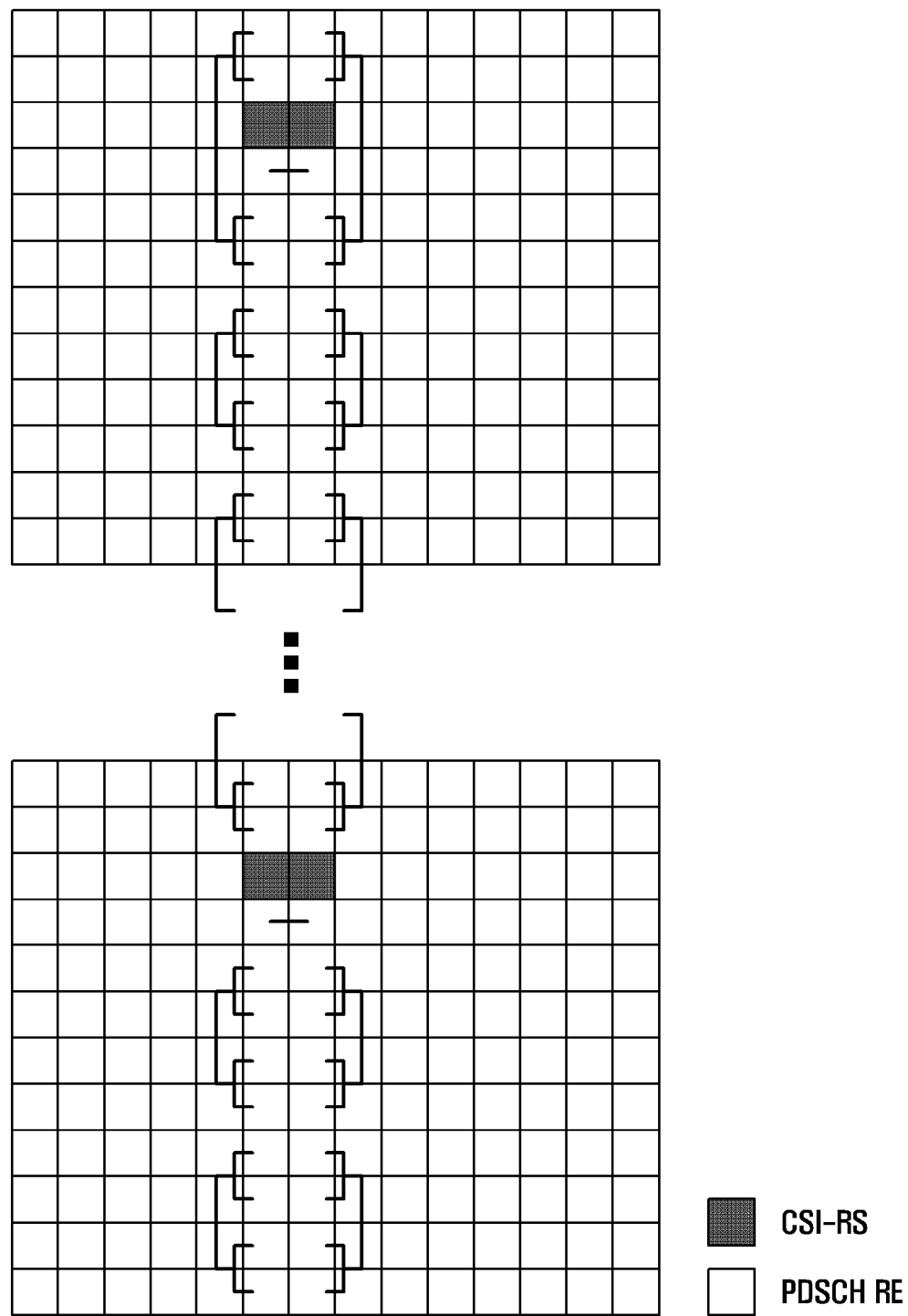
FIG. 32 is a diagram illustrating an arrangement of inter-OFDM-precoded symbols in an LTE-A system according to an exemplary embodiment of the present invention.

FIG. 32 is a diagram illustrating an arrangement of inter-OFDM-precoded symbols in an LTE-A system according to an exemplary embodiment of the present invention.

In SFBC, if a pair of precoded symbols experience largely different channel environments, this is likely to cause demodulation error. The demodulation error causes performance degradation in a turbo code decoding process. In order to avoid the demodulation error, exemplary embodiments of the present invention propose a resource mapping method in which a pair of data symbols is precoded into the REs across two adjacent OFDM symbols. The resource mapping method according to the fifth exemplary embodiment of the present invention can be applied to only to the case where the CSI-RSs of two antenna ports are transmitted unlike the aforementioned other methods.

In this case, the REs adjacent to the REs to which the CSI-RSs are mapped are SFBC-precoded across the OFDM symbols having the CSI-RS regardless of the number of antenna ports of the CSI-RSs as shown in FIG. 32. In case that the CSI-RSs of two antenna ports are transmitted as shown in FIG. 32, the CSI-RSs are mapped to the REs on the same subcarrier across two adjacent OFDM symbols. Accordingly, the REs to be precoded across two OFDM symbols are the REs adjacent to the REs to which the CSI-RSs are mapped in the OFDM symbols having the CSI-RS. The REs to be precoded across two OFDM symbols are determined as follows: In case that the index n of the RE to which a CSI-RS is mapped is an odd number (mod(n, 2)=1), the RE having an index n−1 in the OFDM carrying the CSI-RS is transmitted with an inter-OFDM symbol-precoded symbol. In case that the index n of the RE to which a CSI-RS is mapped is an even number (mod(n, 2)=0), the RE having an index n+1 in the OFDM carrying the CSI-RS is transmitted with an inter-OFDM symbol-precoded symbol.

One or more of the aforementioned exemplary methods for transmitting the REs on some subcarriers with an inter-OFDM symbol-precoded symbol can be supported in the LTE-A system. In case that more than one method is supported, the eNB can notify the UE of the applied method through a physical layer signaling or an upper layer signaling. Accordingly, the UE has the knowledge about positions on the subcarriers where the inter-OFDM symbol-precoded symbol or control signals are transmitted. Based on this knowledge, the UE demodulates the symbols mapped to the corresponding REs with SFBC decoding.

Among the aforementioned exemplary methods, the LTE-A system can operate with one fixed method, all of them selectively, or a combination of at least two of them. Except for the case of using the fixed method, the eNB notifies the UE of the resource mapping method applied for the transmission by means of a physical layer control signal or an upper layer control signal. Accordingly, the user can receive the signals with an appropriate resource mapping method.

As described above, exemplary resource mapping methods of the present invention are capable of avoiding the decoding performance degradation and the demodulation error caused by paired symbols that are far-apart.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving data in a wireless communication system using transmission diversity, the method comprising:
   receiving, by a receiver, a signal including precoded data symbols on a plurality of resource blocks, each resource block comprising Orthogonal Frequency Division Multiplexing (OFDM) symbols and each OFDM symbol comprising a plurality of first resource elements and a plurality of second resource elements;
   determining, by a resource element demapper, whether the precoded data symbols are mapped to the plurality of first resource elements of one OFDM symbol;
   demapping, by the resource element demapper, a precoded data symbol from one resource element from among the plurality of first resource elements of the one OFDM symbol if the precoded data symbol is mapped to the one resource element from among the plurality of first resource elements of the one OFDM symbol; and
   decoding, by a decoder, the precoded data symbol according to a symbol precoding scheme,
   wherein at least one resource element of the plurality of first resource elements in the one OFDM symbol is muted if the number of the plurality of first resource elements in the one OFDM symbol is odd,
   wherein the demapping of the precoded data is skipped for each resource element that is muted, and
   wherein reference signals are mapped to the plurality of second resource elements in the one OFDM symbol.

2. The method of claim 1, wherein a channel state information reference signal (CSI-RS) is mapped to one of the plurality of second resource elements in the one OFDM symbol of the resource block.

3. An apparatus for receiving data in a wireless communication system using transmission diversity, the apparatus comprising:
   an antenna configured to receive a signal including precoded data symbols on a plurality of resource blocks, each resource block comprising Orthogonal Frequency Division Multiplexing (OFDM) symbols and each OFDM symbol comprising a plurality of first resource elements and a plurality of second resource elements
   a resource element demapper configured to:
      determine whether the precoded data symbols are mapped to the plurality of first resource elements of one OFDM symbol, and
      demap a precoded data symbol from one resource element from among the plurality of first resource elements of the one OFDM symbol if the precoded data symbol is mapped to the one resource element from among the plurality of first resource elements of the one OFDM symbol; and
   a decoder configured to decode the precoded data symbol according to a symbol precoding scheme,
   wherein at least one resource element of the plurality of first resource elements in the one OFDM symbol is muted if the number of the plurality of first resource elements in the one OFDM symbol is odd,
   wherein the demapping of the precoded data is skipped for each resource element that is muted, and
   wherein reference signals are mapped to the plurality of second resource elements in the one OFDM symbol.

4. The apparatus of claim 3, wherein a channel state information reference signal (CSI-RS) is mapped to one of the plurality of second resource elements in the one OFDM symbol of the resource block.

5. The method of claim 1, wherein the symbol precoding scheme is transmit diversity comprising at least one of space frequency block coding (SFBC) and frequency switched transmit diversity (FSTD).

6. The method of claim 1, wherein a physical broadcast channel (PBCH), synchronization signals, and a physical downlink control channel (PDCCH) are further mapped to the plurality of second resource elements.

7. The method of claim 1, wherein the precoded data symbols are mapped to the plurality of first resource elements from a first subcarrier of the one OFDM symbol to a last subcarrier of the one OFDM symbol in a sequence.

8. The apparatus of claim 3, wherein the symbol precoding scheme is transmit diversity comprising at least one of space frequency block coding (SFBC) and frequency switched transmit diversity (FSTD).

9. The apparatus of claim 3, wherein a physical broadcast channel (PBCH), synchronization signals, and a Physical downlink control channel (PDCCH) are mapped to the plurality of second resource elements.

10. The apparatus of claim 3, wherein precoded data symbols are mapped to the plurality of first resource elements from a first subcarrier of the one OFDM symbol to a last subcarrier of the one OFDM symbol in a sequence.

* * * * *